United States Patent [19]

Cozewith et al.

[11] Patent Number: 5,733,980
[45] Date of Patent: Mar. 31, 1998

[54] ETHYLENE α-OLEFIN BLOCK COPOLYMERS AND METHODS FOR PRODUCTION THEREOF

[75] Inventors: Charles Cozewith, Watchung; Gary William Ver Strate, Manalapan; Roger K. West, Montclair; Gaetano A. Capone, Dumont, all of N.J.

[73] Assignee: Exxon Chemical Patents Inc., Houston, Tex.

[21] Appl. No.: 532,372

[22] Filed: Sep. 22, 1995

Related U.S. Application Data

[63] Continuation of Ser. No. 223,873, Apr. 6, 1994, abandoned.

[51] Int. Cl.$^6$ .......................... C08L 23/04; C08L 23/16; C08F 4/20; C08F 297/08
[52] U.S. Cl. .......................... 525/314; 525/89; 525/95; 525/98; 525/323; 525/324; 526/72; 526/75; 526/78; 526/86; 526/87; 526/89; 526/90; 526/335; 526/336; 526/339; 526/348
[58] Field of Search ..................... 525/314, 89, 95, 525/98, 323, 324; 526/72, 75, 78, 86, 87, 89, 90, 335, 336, 339, 348

[56] References Cited

U.S. PATENT DOCUMENTS

| | | | |
|---|---|---|---|
| 3,378,606 | 4/1968 | Kontos | 260/878 |
| 3,378,608 | 4/1968 | Hassell et al. | 260/878 |
| 3,499,060 | 3/1970 | Sumki et al. | 260/878 |
| 3,798,288 | 3/1974 | McManimie et al. | 260/878 B |
| 4,065,520 | 12/1977 | Bailey et al. | 260/878 B |
| 4,408,019 | 10/1983 | Blunt | 525/323 |
| 4,481,336 | 11/1984 | Fujii et al. | 525/323 |
| 4,540,753 | 9/1985 | Cozewith et al. | 526/88 |
| 4,716,207 | 12/1987 | Cozewith et al. | 526/169.2 |
| 4,804,794 | 2/1989 | Verstrate et al. | 585/12 |
| 4,843,129 | 6/1989 | Spenadel et al. | 525/240 |
| 4,882,406 | 11/1989 | Cozewith et al. | 526/336 |
| 4,900,461 | 2/1990 | Verstrate et al. | 252/49.6 |
| 4,959,436 | 9/1990 | Cozewith et al. | 526/348 |
| 5,030,695 | 7/1991 | Cozewith et al. | 525/207 |

FOREIGN PATENT DOCUMENTS

| | | |
|---|---|---|
| 0129414 | 12/1984 | European Pat. Off. . |
| 0299608 | 1/1989 | European Pat. Off. . |
| 41 30 429 A1 | 3/1993 | Germany . |
| 4130429 A1 | 4/1993 | Germany . |
| 63063712 | 3/1988 | Japan . |
| 1175670 | 12/1969 | United Kingdom . |
| 1190492 | 5/1970 | United Kingdom . |
| 1594542 | 2/1978 | United Kingdom . |
| WO 91/12285 | 8/1991 | WIPO . |

OTHER PUBLICATIONS

Hawley's Condensed Chemical Dictionary, p. 936, Jan. 1993.
*Polymer Technology Dictionary*, Whelan; 1994, p. 282.
"The Effect of Molecular Weight and Molecular Weight Distribution on the Non–Neutonian Behavior of Ethylene––Diene Polymers", Trans. Soc. Rheol., 14, 83 (Jan. 1970); C.K. Shih Jan. 1970.

*Primary Examiner*—W. Robinson H. Clark
*Attorney, Agent, or Firm*—Douglas W. Miller

[57] ABSTRACT

This invention relates to block polymers containing both crystalline and elastomeric blocks, the block copolymer having an A block and a B block. The A block is a polyethylene or an ethylene polymer optionally containing an alpha-olefin and is generally crystalline. The B block contains an ethylene, α-olefin copolymer segment and optionally contain an ethylene, α-olefin, non-conjugated diene terpolymer segment. If the B block contains a diene containing segment, the diene containing segment is furthest from the junction of the A and the B blocks. Also disclosed is a process for manufacture of the block copolymers and methods for coupling the block copolymers. Coupled block copolymers are useful as thermoplastic elastomers exhibiting physical properties approaching those of crosslinked EP or EPDM elastomers, but showing thermal processability after coupling. The block copolymers of the present invention may also be used as a lubricant or fuel additive, as a plastics blend component, in bitumen blends, as a component in hot melt adhesives and as a component of roof sheeting compounds.

41 Claims, 6 Drawing Sheets

ETHYLENE α-OLEFIN BLOCK COPOLYMERS AND METHODS FOR PRODUCTION THEREOF

This is a continuation of U.S. Ser. No. 08/223,873 filed Apr. 6, 1994, now abandoned.

TECHNICAL FIELD

This invention relates to block polymers containing both crystalline and elastomeric blocks. The copolymers have blocks of polyethylene, optionally containing an α-olefin and blocks containing ethylene, an α-olefin, and optionally a non-conjugated diene comonomer. A novel process for producing the block copolymers is also provided.

BACKGROUND

Block copolymers are well known. They have been used commercially as components in adhesives, as melt processable rubbers, in impact resistant thermoplastics, as compatibilizers, as "surfactants" for emulsifying polymer-polymer blends, and as viscosity index improvers in lubricating oils. A block copolymer is created when two or more polymer molecules of different chemical composition are covalently bonded in an end-to-end fashion. While a wide variety of block copolymer architectures are possible, most block copolymers of interest involve the covalent bonding of hard plastic blocks, which are substantially crystalline or glassy, to elastomeric blocks forming thermoplastic elastomers. Other block copolymers, such as rubber-rubber (elastomer-elastomer), glass-glass, and glass-crystalline block copolymers are also possible and may have commercial importance. Two common types of block copolymer structures are the diblock and tri-block forms. However, multi-block copolymers, in which more than three blocks are bonded together, are also desirable. The multi-block copolymers include either linear multi-block or multi-arm star block polymers.

Tri-block and multi-block copolymers containing "hard" and "soft" blocks have the unique ability of behaving as thermoplastic elastomers, combining thermoplasticity with rubber-like behavior. The typical requirement for achieving thermoplastic elastomeric behavior is the ability to develop a two-phase physical network. Such a system is composed of a portion of hard block, having a glass transition temperature ($T_g$) or melting temperature ($T_m$) above the service temperature of a fabricated end use product, and a portion of a soft block, having a $T_g$ below the service temperature. The hard blocks associate to form domains that serve as physical crosslinks and reinforcement sites. The reinforcement sites and physical cross-links are thermally reversible, making it possible to process the polymer as a melt phase material at temperatures above the $T_g$ or $T_m$ of the hard block. Among the advantages of having a physically cross-linked system that is thermally reversible is that while below the $T_g$ or $T_m$ of the hard block such polymers exhibit properties approaching those of fully-cured, i.e. chemically crosslinked elastomers, but unlike such cured elastomers, by heating these polymers above $T_g$ or $T_m$ of the hard block, the physical crosslinks are eliminated and the material can be processed. The advantage of such systems will be well known to those of ordinary skill in the art.

A substantial amount of work has been done in an attempt to synthesize olefinic block copolymers. The ideal catalyst system would produce a "living polymer". Unlike typical Ziegler-Natta polymerization processes, living polymerization processes involve only initiation and propagation steps and essentially lack chain terminating side reactions. This permits the synthesis of the predetermined and well-controlled structures desired in a block copolymer. A polymer created in a "living" system can have a narrow or extremely narrow distribution of molecular weight and be essentially monodisperse. Living catalyst systems are characterized by an initiation rate which is on the order of or exceeds the propagation rate, and the absence of termination or transfer reactions. In addition, these catalyst systems are preferably characterized by the presence of a single type of active site. To produce a high yield of block copolymer product in a polymerization process the catalyst must exhibit living characteristics to a substantial extent.

Anionic polymerization routes to ideal block copolymers have been studied. Butadiene-isoprene block copolymers have been synthesized using the sequential monomer addition technique. In sequential addition, a certain amount of one of the monomers is contacted with the catalyst. Once a first such monomer has reacted to substantial extinction forming the first block, a certain amount of the second monomer or monomer species is introduced and allowed to react to form the second block. The process may be repeated using the same or other anionically polymerizable monomers. Ethylene and other α-olefins, such as propylene and butene, are not directly block polymerizable by anionic techniques.

U.S. Pat. No. 4,716,207 to Cozewith, et al., discloses nodular polymers with 2 portions, the first being ethylene and at least one other alpha-olefin. When the first portion has grown to at least 50% of its theoretical molecular weight at the completion of polymerization, a diene monomer is added. The diene monomer has both double bonds Ziegler polymerizable, or one Ziegler polymerizable double bond and one cationically polymerizable double bond which can be coupled to produce a nodular polymer. A vanadium catalyst and an organoaluminum cocatalyst are employed.

U.S. Pat. No. 4,804,794 to Ver Strate, et al., discloses segmented copolymers of ethylene and at least one other alpha-olefin. The copolymers have a narrow MWD (Mw/Mn) less than 2. The copolymers have one segment that is crystallizable and at least one low crystallinity segment. A vanadium catalyst is utilized with an organoaluminum cocatalyst. The polymerization is carried out in a mix-free reactor.

WO 9112-285-A to Turner, et al., discloses a process for production of block copolymers of ethylene with an alpha-olefin and the polymer produced by the process. The process includes sequentially contacting ethylene with an alpha-olefin in the presence of an ionic catalyst to produce a block copolymer. The ionic catalyst comprises the reaction product of a first component which is a bis (cyclopentadienyl) derivative of a metal of Group IV-B of the Periodic Table of the Elements which metal is capable of forming a cation formally having a coordination number of 3 and a valence of −4; and at least one second component comprising a cation capable of donating a proton and a compatible non coordinating anion.

While many patents and publications claim the Ziegler-Natta catalyzed synthesis of block copolymers from ethylene and propylene, there is little evidence that these products were obtained in high purity. In Boor, *J. Ziegler-Natta Catalysts and Polymerization*, Academic Press, 1979, Boor states that the known kinetic features of heterogeneous Ziegler-Natta catalysts suggest that it is unlikely that block polymers were synthesized in a substantial yield, as compared to the total polymer formed. This publication is incorporated herein by reference for purposes of U.S. patent practice.

In this context, several difficulties arise in the use of known coordination catalysts for the block copolymerization of α-olefins. Among those are the fact that conventional catalysts are typically multi-sited, and a significant fraction of the active sites are unstable. This leads to non-uniform chain initiation and termination which, in turn, lowers the theoretical block copolymer yield. In addition, chain transfer rates during polymerization with known coordination catalysts are high. This is especially true with metallocene catalyst systems where thousands of chains may be produced per active site.

SUMMARY

The present invention is directed to procedures to make the use of certain coordination catalysts possible for production of alpha-olefin block copolymers of the crystalline-elastomeric type in high purity. These block copolymers and methods of their manufacture by a Ziegler-Natta type catalyst are objects of our invention. We will demonstrate the existence of high yields of true block copolymers. Evidence of the existence of such high yield of true block copolymer, as stated above, has been substantially absent prior to the present invention.

The present invention comprises a novel block polymer having an A block and a B block, and with a diene in the B block, a nodular polymer formed by coupling two or more block polymers. The block copolymer comprises an A block, and a B block, wherein the A block is an ethylene polymer optionally containing an alpha-olefin. The B block has at least a first polymer segment that is an ethylene and an alpha-olefin copolymer segment and the first polymer segment is contiguous to a junction of the A block and the B block. The B block may additionally have a tip segment, where the tip segment is furthest from the A B junction. The tip segment is a polymer of ethylene, an alpha-olefin, and optionally a non-conjugated diene, the diene being present up to about 10 mole percent based on the total moles of the monomers of the block copolymer. If a diene is present in the B block, the diene is optimally located in a tip segment furthest from the A B junction.

The present invention also comprises a process for producing these block copolymers, which has the steps of:

(a) Forming a catalyst species by premixing a vanadium compound and an organoaluminum compound. The pre-mixing step is carried out for a sufficient period of time to provide an adequate amount of active catalyst species;

(b) Feeding the reaction product of step (a) to a mix free reactor concurrently with a monomer stream made up of ethylene, and optionally an alpha-olefin;

(c) Feeding at least a second monomer blend made up of ethylene, and an alpha-olefin;

(d) Optionally, feeding a monomer blend made up of ethylene, an alpha-olefin, and a non-conjugated diene.

When the diene is present, the block copolymer may be coupled using the residual olefinic functionality of the diene to produce nodular polymers. Coupling can take place either in the reactor, or post reactor. A coupling agent may be used to couple two or more block copolymers.

These block copolymers find use as thermoplastic elastomers (TPE), plastics blending components, in fuel lubricating and heating oils, as a bitumen modifier, in roof sheeting compounds, and in hot melt adhesives.

These and other features, aspects and advantages of the present invention will become better understood with reference to the following description, appended claims and accompanying drawings where:

DESCRIPTION OF THE PREFERRED EMBODIMENTS

Figure 1:
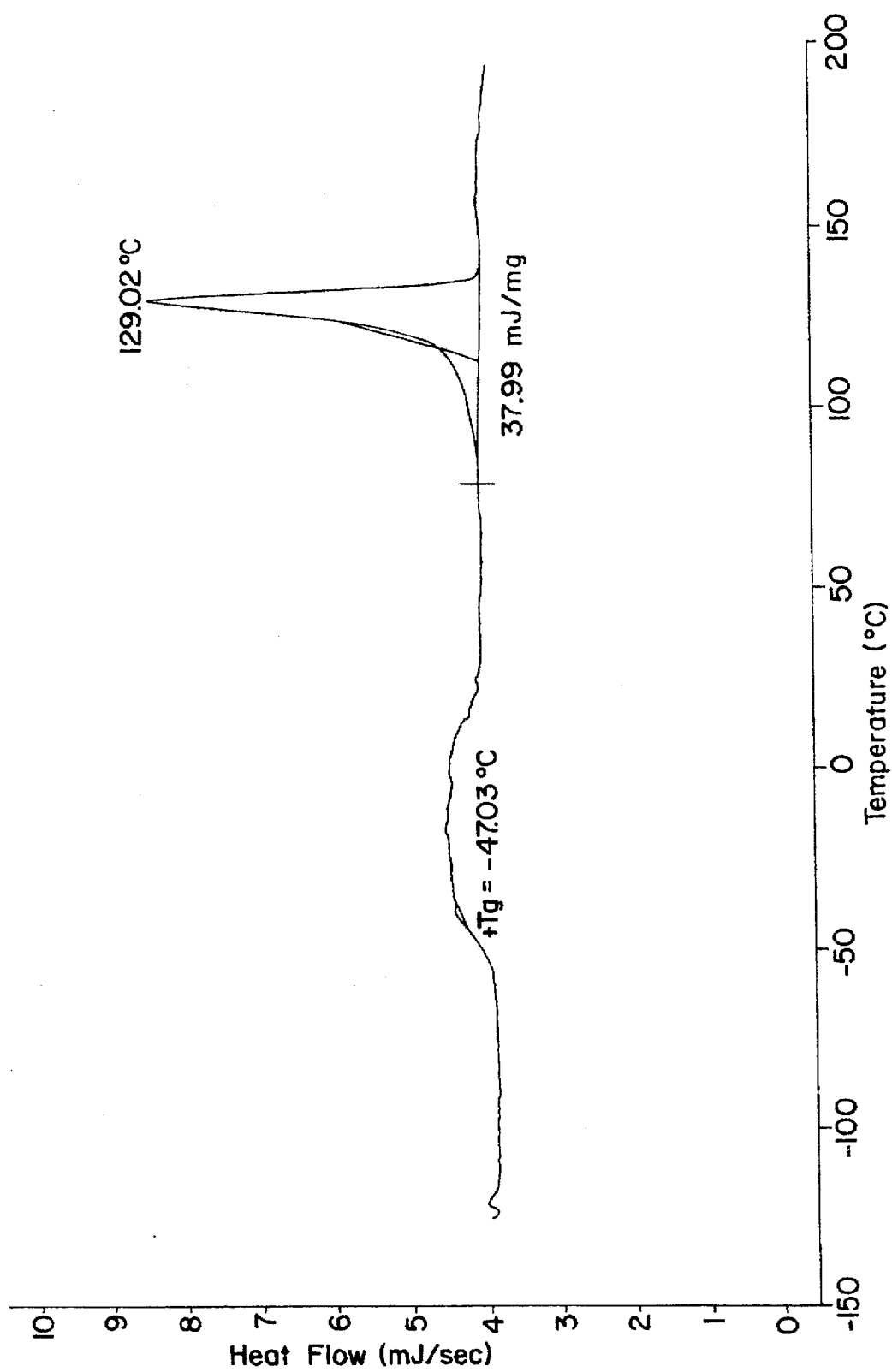
FIG. 1 is a Differential Scanning Calorimeter (DSC) thermogram for polymer 1C described in Example 1.

The present invention is directed to procedures to make and use certain alpha-olefin block copolymers of the crystalline-elastomeric type in high purity using certain coordination catalysts. These block copolymers and methods of their manufacture by a Ziegler-Natta type catalyst are among the objects of our invention.

The present invention comprises a novel block copolymer having an A block and a B block and a nodular polymer formed by coupling two or more block copolymers. The nodular polymer may optionally contain a coupling agent Y;

(1) "A" denotes a block comprising polyethylene, and optionally an α-olefin comonomer the α-olefin comonomer not exceeding 5 mole percent of the total A block based on the total moles of the monomers of the A block.

The A block is present in the block copolymer preferably in the range of from about 5 to 90 weight percent based on the total weight of the block copolymer. More preferably in the range of from about 10 to about 60 weight percent, most preferably in the range of from about 20 to about 50 weight percent.

(2) "B" denotes a block comprising an ethylene, an α-olefin, and optionally a non-conjugated diene copolymer. The B block comprises one or more segments. If there is one segment in the B block, it will be an ethylene, α-olefin segment. If there are two or more segments in the B block, the first segment immediately following the junction of the A and B blocks will be an ethylene α-olefin copolymer segment. The end or tip segment will typically be located in the portion of the B block furthest from the A B junction. If there are two or more segments, the end or tip segment will be an ethylene, α-olefin, non-conjugated diene terpolymer not exceeding about 10 mole percent diene based on the total moles of the monomers of the A B block copolymer.

Where there are 2 or more segments in the B block, the diene present in the B block will be optimally located in the segment farthest from the junction of the A block and the B block. This can alternatively be described as having a diene tip. The B block is present in the block copolymer in the range of from about 10 to about 95 weight percent based on the total weight of the block copolymer.

Optionally the B block has an intramolecular composition distribution such that at least two portions of the B block, each portion comprising at least 5 weight percent of the B block, differ in composition by at least 5 weight percent ethylene. The B block is present in the block copolymer in the range of from about 10 to about 95 weight percent based on the total weight of the block copolymer.

The the tip of the B block can comprise up to 50 weight percent of the B block, preferably in the range of from about 3 to about 20 weight percent, more preferably in the range of from about 5 to about 15 weight percent, all weight percents of the tip based on the total weight of the B block. The tip segment, when present, is typically the segment furthest from the A B junction.

Y is a coupling agent which has reacted with the residual olefinic functionality in the block polymers and has coupled two or more block polymer molecules. A is a crystalline block and B has elastomeric segments. The B block may optionally contain a low level of crystallinity.

COPOLYMER BLOCKS

BLOCK A

Block A comprises polyethylene. The A block may optionally contain an $\alpha$ comonomer at a level not exceeding 5 mole percent based on the total moles of the monomers of the A block. Block A comprises about 5 to 90 weight percent of the entire polymer, preferably 10 to 60 weight percent, most preferably 20 to 50 weight percent of the entire polymer. The A block has a $T_m$ of at least about 110° C., preferably at least about 105° C., more preferable at least about 120° C.

BLOCK B

Block B is an elastomer that comprises an ethylene, an $\alpha$-olefin, and optionally a non-conjugated diene copolymer. The B block may contain a non-conjugated diene in an amount of up to about 10 mole percent based on the total moles of the monomers of the A B block copolymer. The B block comprises 95 to 10 weight percent of the total weight of the block copolymer, preferably 90 to 40 weight percent; more preferably 80 to 50 weight percent.

The B block comprises one or more segments. If there are two or more segments in the B block, the tip or end segment furthest from the junction of the A block and the B block may comprise an ethylene, $\alpha$-olefin, non-conjugated diene terpolymer. The diene does not exceed 10 mole percent of the total moles of the monomers of the block copolymer, more preferably the diene is present in the range of from about 0.03 to about 5 mole percent, most preferably the diene is present in the range of from about 0.05 to about 1 mole percent based on the total moles of the monomers of the block copolymer.

The tip of the B block can comprise up to 50 weight percent of the B block, preferably in the range of from about 3 to about 20 weight percent, more preferably in the range of from about 5 to about 15 weight percent, all weight percents of the tip based on the total weight of the B block. The tip segment, when present, is typically the segment furthest from the A B junction.

The B block may contain a non-conjugated diene is n an amount of up to about 10 mole percent based on the total moles of the monomers of the A B block copolymer. The B block comprises 95 to 10 weight percent of the total weight percent of the block copolymer, preferably 90 to 40 weight percent, more preferably 80 to 50 weight percent.

The B block can comprise an average ethylene content in the range of from about 20 to about 90 mole percent, preferably in the range of from about 30 to about 85 mole percent, and most preferably in the range of from about 50 to about 80 mole percent based on the total moles of the monomers of the B block.

The block copolymers of the invention are further characterized in that they have a number average molecular weight of between 750 and 20,000,000 and have a molecular weight distribution characterized by a $M_w/M_n$ ratio of less than 2.5. The block copolymers have an n-hexane soluble portion, at 22° C. not exceeding about 50 weight percent, preferably not exceeding 40 weight percent, and more preferably not exceeding 30 weight percent, based on the total weight of the block copolymer. The products of the present invention are further characterized by a relatively small amount of polymer chains in the final product that contain only an A block or only a B block. The presence of such materials could detract from overall product properties. A typical characteristic of the preferred product of this invention is that the block copolymer contains at least 50% (weight) of the desired A B structure as polymerized. Product purification is not necessary to obtain good properties.

Monomers

Alpha-olefins particularly useful in the practice of this invention are those having from 3 to 8 carbon atoms, e.g. propylene, butene-1, pentene-1, etc. Alpha-olefins of 3 to 6 carbon atoms are preferred due to economic considerations. The most preferred $\alpha$-olefin is propylene.

Typical non-limiting examples of non-conjugated dienes useful in the practice of this invention are:

(a) straight chain acyclic dienes such as: 1,4-hexadiene; 1,6-octadiene;

(b) branched chain acyclic dienes such as: 5-methyl-1,4-hexadiene; 3,7-dimethyl-1,6-octadiene; 3,7-dimethyl-1,7-dioctadiene; and the mixed isomers of dihydromyrcene and dihydro-ocinene;

(c) single ring dienes such as: 1,4-cyclohexadiene; 1,5-cyclooctadiene; and 1,5-cyclododecadiene;

(d) multi-ring fixed and fused ring dienes such as: tetrahydroindene; methyltetrahydroindene; dicyclopentadiene; bicyclo-(2,2,1)-hepta-2,5-diene; alkenyl, alkylidene, cycloalkenyl and cycloalkylidene norbornenes such as 5-methylene-2-norbornene (MNB), 5-ethylidene-2-norbornene (ENB), 5-propenyl-2-norbornene, 5-(4-cyclopentenyl)-2-norbornene, 5-cyclohexylidene-2-norbornene, vinyl norbornene, and norbornadiene.

Of the non-conjugated dienes useful in the practice of the invention, dienes containing at least one of the double bonds in a strained ring are preferred. The most preferred dienes are 5-ethylidene-2-norbornene and vinyl-norbornene. Conjugated dienes are also contemplated.

Polymerization

The novel polymers of our invention are prepared by polymerization in a mix-free reactor similar to that taught in U.S. Pat. No. 4,959,436, the teachings of which were previously incorporated by reference for the purposes of U.S. patent practice.

Previously, those of skill in the art thought that a solution polymerization process such as that taught in U.S. Pat. No. 4,959,436 would not be suitable for producing block copolymers such as the ones described above in which one of the blocks, polyethylene, is insoluble in the solvent. The insolubility could lead to reactor fouling and mass transport problems. In turn, these problems could prevent the formation of the desired well-defined polymer structure and significantly reduce catalyst efficiency.

Surprisingly, we have found that the block polymers of our invention can be made in a mix-free reactor when the initial monomer feed consists essentially of ethylene, and optionally up to about 5 mole percent of an alpha-olefin based on the total moles of the monomers of the A block. This, the A block, is polymerized first. During this part of the reaction, the polyethylene (A) block may be only partially soluble in the reaction diluent and the insoluble polymer block forms a suspension in the diluent.

Once the polymerization of the A block is substantially complete, one or more additional monomer feeds are introduced into the reactor containing ethylene, an α-olefin and, optionally, a non-conjugated diene. The reaction of the comonomer mixtures form the B block of the block polymer or the first segment of the B block if there is more than one segment. The B block is polymerized onto the polyethylene or A block formed earlier. When this second part of the polymerization occurs, there is a noticeable change in the appearance of the reaction medium. As the chains become solubilized through the addition of the B block, the turbidity of the medium decreases appreciably and the quantity of polymer particles in the diluent is markedly reduced. When a tubular reactor is employed, several monomer feeds along the reactor length may be used to control the composition and amount of the B block and form the segments of the B block. Generally, until the last feed point, only ethylene and an α-olefin are fed, in varying portions. At the last feed point a diene may be introduced either by itself or with varying amounts of ethylene and an α-olefin, to form a diene containing chain segment.

Coupling the Polymers

Block polymers of our invention may incorporate a diene. The residual olefinic functionality in diene containing block polymers can be reacted with coupling agents to produce novel nodular polymers.

Suitable coupling reagents and coupling techniques are described in U.S. Pat. No. 4,882,406 the teachings of which have previously been incorporated by reference for purposes of U.S. patent practice. Coupling can take place either within the polymerization reactor or in a post-polymerization reaction. With the diene present in the B block, the segment containing diene is in a central EPDM nodule with the remainder of the EP and polyethylene block extending outwards.

There are various coupling agents that are capable of reacting with the residual unsaturation in the polymer chains to cause coupling of two or more block polymer molecules.

Coupling may be carried out with cationic catalysts such as Lewis acids. Suitable Lewis acids may be selected from the group consisting of: $AlX_3$, $BX_3$, $SnX_4$, $SbX_5$, $AlR_yX_{3-y}$ where y is 0 to 1.5 and R is a hydrocarbon radical, $BX_4$, $TiX_4$ and mixtures thereof, where X is selected from the group consisting of chlorine, bromine, and iodine. Chlorine is preferred. For Lewis acids that do not interfere with the functioning of the catalyst system used to carry out the polymerization, the Lewis acid can be added directly to the reactor so that chain coupling occurs at the same time as the polymerization. Alternately the coupling agent can be added following the polymerization.

According to yet another embodiment the coupling agent may be a free radical catalyst. The free radical catalyst may be a peroxide selected from the group consisting of: dicumyl peroxide, di-tertiarybutylperoxide, t-butylperbenzoate, 1,1-di(t-butylperoxy)-3,3,5-trimethyl cyclohexane, and mixtures thereof. Other free radical catalysts include azobisisobutrolnitrile, azodicarboxylate, and mixtures thereof. Peroxides can couple non-diene containing portions of the chain and produce a cross-linked network. Care must be taken when they are used as coupling agents.

In yet another embodiment the coupling agent may be selected from the group consisting of sulfur dichloride, disulfenyl halides, borane, dithioalkanes, other sulfur and accelerated sulfur curatives and mixtures thereof, such as mercaptobenzothiozole, tetramethylthiuram disulfide, and butyl zymate. It is apparent that any of the conventional vulcanization systems useful for EPDM may be employed.

Resins and other reagents may also be employed for coupling. For example alkyl phenol formaldehyde mixtures will couple olefins in certain cases with catalysts such as $ZnCl_2$, N-bromosuccinimide or diphenylbromomethane.

Also contemplated as a coupling mechanism is the use of irradiation or electron beams.

For certain non-conjugated dienes, such as norbornadiene, vinyl norbornene, dicyclopentadiene and tetrahydroindene, both double bonds are polymerizable to a greater or lesser extent by the polymerization catalysts of this invention. With dienes of this type chains can become chemically coupled to each other during polymerization by reaction of the remaining double bond in an enchained diene monomer with a growing chain. This process will lead to coupling of chains in the reactor even in the absence of a coupling agent Y.

The efficiency of olefin utilization will determine what level of coupling agent to use in relation to the amount of diene in the block copolymer. The purpose is to couple the diene to an extent which yields good mechanical properties but does not raise viscosity or produce gel to the extent that the coupled product is not processable.

The Reaction Solvent

Processes in accordance with the present invention produce copolymers by polymerization of a reaction mixture comprised of catalyst, ethylene and at least one additional et-olefin monomer and optionally diene. Polymerization in the presence of a diluent which has the capability to dissolve a major portion of the final product is preferred. Suitable solvents are described in U.S. Pat. No. 4,882,406 the teachings of which are incorporated by reference for purposes of U.S. patent practice.

Polymerization Reactor

These processes are carried out in a mix-free reactor system, which is one in which substantially no mixing occurs between portions of the reaction mixture that contain polymer chains initiated at different times. Suitable reactors are disclosed in U.S. Pat. Nos. 4,959,436 and 4,882,406 both of which have been incorporated by reference for the purposes of U.S. patent practice. Additional reaction considerations are also disclosed in these references.

To obtain the desired A B block polymer, it is necessary to add additional reactants (e.g., at least one of the monomers ethylene, α-olefin or diene) either at some point or points along the length of a tubular reactor, or during the course of polymerization in a batch reactor, or at various points in a train of continuous flow stirred reactors. However, it is also preferred to add essentially all of the catalyst at the inlet of a continuous flow reactor or at the onset of batch reactor operation to meet the requirement that essentially all polymer chains are initiated simultaneously. To make diene containing block polymers, diene is added later in the polymerization, preferably at or near the last feed point, to incorporate diene into a segment of the B block. Multiple feeds of ethylene and propylene can be used to control the amount and composition of the segments in the B block. To make diene containing segments at the end of the B block, diene is fed as part of the last monomer feed.

Since the tubular reactor is the preferred reactor system for carrying out processes in accordance with the preferred embodiment, the illustrative descriptions and examples that follow are drawn to that system, but will apply to other reactor systems as will readily occur to those of ordinary skill in the art having the benefit of the present disclosure. However, as would readily occur to those of ordinary skill in the art having the benefit of the present disclosure, more than one reactor could be used, either in parallel, or in series with multiple monomer feeds to vary intramolecular composition.

The Catalyst

The composition of the catalyst used to produce ethylene, α-olefin copolymers has a profound effect on copolymer product properties such as compositional dispersity and MWD. The catalyst utilized in practicing processes in accordance with the preferred embodiment should be such as to yield essentially one active catalyst species in the reaction mixture. More specifically, it should yield one primary active catalyst species which provides for substantially all of the polymerization reaction. Additional active catalyst species could be present, provided that they do not produce a significant amount of polymer which detracts from the performance of the polymer produced. Such additional active catalyst species may provide as much as 35% by weight of the total copolymer. Preferably, they should account for about 10% by weight or less of by the copolymer. Thus, the essentially one active species should provide for at least 65% by weight of the total copolymer produced, preferably for at least 90% by weight thereof. The extent to which a catalyst species contributes to the polymerization can be readily determined using the below-described techniques for characterizing catalyst according to the number of active catalyst species. Techniques for characterizing catalyst according to the number of active catalyst species are within the skill of the art. These techniques are shown in Cozewith, C. and Ver Strate, G., "Ethylene-Propylene Copolymers. Reactivity Ratios, Evaluation and Significance", *Macromolecules*, 4,482 (1971), which is incorporated herein by reference for purposes of U. S patent practice.

The preferred catalyst system in practicing processes in accordance with these embodiments comprises a hydrocarbon-soluble vanadium compound in which the vanadium valence is 3 to 5 and an organo-aluminum compound, with the provision that the catalyst system yields essentially one active catalyst as described above. At least one of the vanadium compound/organo-aluminum pair selected must also contain a valence-bonded halogen. Vanadium compounds useful in practicing processes in accordance with the present invention could be:

 (1)

 (2)

where x=0 to 3 and R=a hydrocarbon radical;

V(AcAc)$_3$;

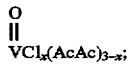 (3)

where AcAc=acetyl acetonate; and where x=1 or 2; and

where n=2 to 3 and B=Lewis base capable of making hydrocarbon-soluble complexes with VCl$_3$, such as tetrahydrofuran, 2-methyl-tetrahydrofuran and dimethyl pyridine. In Formulas (1) and (2) above, R preferably represents a C$_1$ to C$_{10}$ aliphatic, alicyclic or aromatic hydrocarbon radical such as ethyl (Et), phenyl, isopropyl, butyl, propyl, n-butyl, i-butyl, t-butyl, hexyl, cyclohexyl, octyl, naphthyl, etc. Non-limiting illustrative examples of formulas (1) and (2) compounds are vanadyl trihalides, alkoxy halides and alkoxides such as VOCl$_3$, VOCl$_2$(OBu) where Bu=butyl, VO(OC$_2$H$_5$)$_3$, and vanadium dichloro hexanoate. The most preferred vanadium compounds are VCl$_4$, VOCl$_3$, and VOCl$_2$(OR).

As already noted, the co-catalyst is preferably an organoaluminum compound. In terms of chemical formulas, these compounds could be as follows:

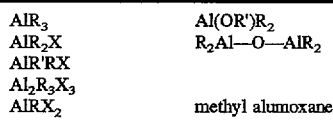

| AlR$_3$ | Al(OR')R$_2$ |
| AlR$_2$X | R$_2$Al—O—AlR$_2$ |
| AlR'RX | |
| Al$_2$R$_3$X$_3$ | |
| AlRX$_2$ | methyl alumoxane | where R and R' represent hydrocarbon radicals, the same or different, as described above with respect to the vanadium compound formula and X is a halogen selected from the group consisting of bromine, iodine, and chlorine. Chlorine is preferred. The most preferred organoaluminum compound for use with a vanadium catalyst is an aluminum alkyl sesquichloride such as Al$_2$Et$_3$Cl$_3$ or Al$_2$(iBu)$_3$Cl$_3$. The catalyst and its effects on the polymerization is disclosed in U.S. Pat. No. 4,882,406, previously incorporated by reference for purposes of U. S patent practice.

With reference again to processes for making copolymer in accordance with our invention, certain combinations of vanadium and aluminum compounds that can comprise the catalyst system can cause branching and gellation during the polymerization for polymers containing high levels of diene. To prevent this from happening, Lewis bases such as ammonia, tetrahydrofuran, pyridine, tributylamine, tetrahydrothiophene, tetraalkoxysilane, etc., can be added to the polymerization system using techniques well known to those skilled in the art.

Chain transfer reactions during tubular reactor polymerization in accordance with our invention broadens polymer molecular weight distribution and causes the formation of undesirable blocks such as A-only polymer or B-only polymer rather than the desired A B block copolymers of the present invention. It is desireable to operate at low temperature and in the absence of Hydrogen to avoid transfer reactions. U.S. Pat. No. 4,882,406 discloses chain transfer reactions. This U.S. patent has previously been incorporated by reference.

Molecular weight distribution and percent of block polymer in the final product are also affected by catalyst deactivation during the course of the polymerization which leads to termination of growing chains. Early chain termination will reduce the yield of the desired block copolymers. Deactivation can be reduced by using the shortest residence time and lowest temperature in the reactor that will produce the desired monomer conversions.

Gel Permeation Chromatography (GPC) and several analytical techniques are used to characterize the polymer and its performance in various applications. These techniques have been described in several publications notably U.S. Pat. No. 4,989,436 which has been previously incorporated for purposes of U.S. patent practice. Molecular weight and composition measurements are described in G. Ver Strate, C. Cozewith, S. Ju, *Macromolecules.*, 21, 3360 (1988). The variety of other techniques used are soundly based in polymer structure characterization as described in "Structure Characterization" *The Science and Technology of*

*Elastomers*, F. Eirich, editor, Academic Press 1978 Chapter 3 by G. Ver Strate. Differential scanning calorimetry (DSC) is used to characterize the block polymers described herein. The standard protocol for these analysis is to load the calorimeter at 20° C. with a specimen free of molding strains, to cool the sample to −75° C., scan to 180° C. at 10° C./min., cool to −75° C., and re-run the scan. $T_g$, $T_m$ and heat of fusion are evaluated. In some cases, low melting crystallinity will not be seen on the second scan as it may take many hours to develop even at low temperatures.

Catalyst Preparation

Polymerizations in accordance with the preferred embodiments should be conducted in such a manner and under conditions sufficient to initiate propagation of essentially all copolymer chains simultaneously. This can be accomplished by utilizing the process steps and conditions described in U.S. Pat. 4,959,436, previously incorporated by reference for purposes of U.S. patent practice.

Reaction Temperature

The temperature of the reaction mixture should also be kept within certain limits. The temperature at the reactor inlet should be high enough to provide complete, rapid chain initiation at the start of the polymerization reaction. The length of time the reaction mixture spends at high temperature must be short enough to minimize the amount of undesirable chain transfer and catalyst deactivation reactions. Control of the reaction temperature in light of the fact that the reaction is exothermic, is disclosed in U.S. Pat. 4,959,436 which has been incorporated by reference for purposes of U.S. patent practice.

Residence Time

Residence time of the reaction mixture in the mix-free reactor can vary over a wide range. The minimum could be as low as about 0.5 seconds. A preferred minimum is about 2 seconds. The maximum could be as high as about 3600 seconds. A preferred maximum is about 900 seconds. The most preferred maximum is about 300 seconds.

Process Flow

When a tubular reactor is used the rate of flow of the reaction mixture through the reactor should be high enough to provide good mixing of the reactants in the radial direction and minimize mixing in the axial direction. Good radial mixing promotes homogeneous temperature and polymerization rate at all points in a reactor cross section. Radial temperature gradients may tend to broaden the molecular weight distribution of the copolymer since the polymerization rate is faster in the high temperature regions. Those of ordinary skill in the art will recognize that achievement of these objectives is difficult in the case of highly viscous solutions. This problem can be overcome to some extent through the use of radial mixing devices such as static mixers (e.g., those produced by the Kenics Corporation).

For purposes of illustration, we assume that a block copolymer of polyethylene and of ethylene and propylene (EP) copolymer is to be produced using as catalyst components vanadium tetrachloride and ethyl aluminum sesquichloride. The polymerization is adiabatic, using hexane diluent for both the catalyst system and the reaction mixture.

Figure 6:
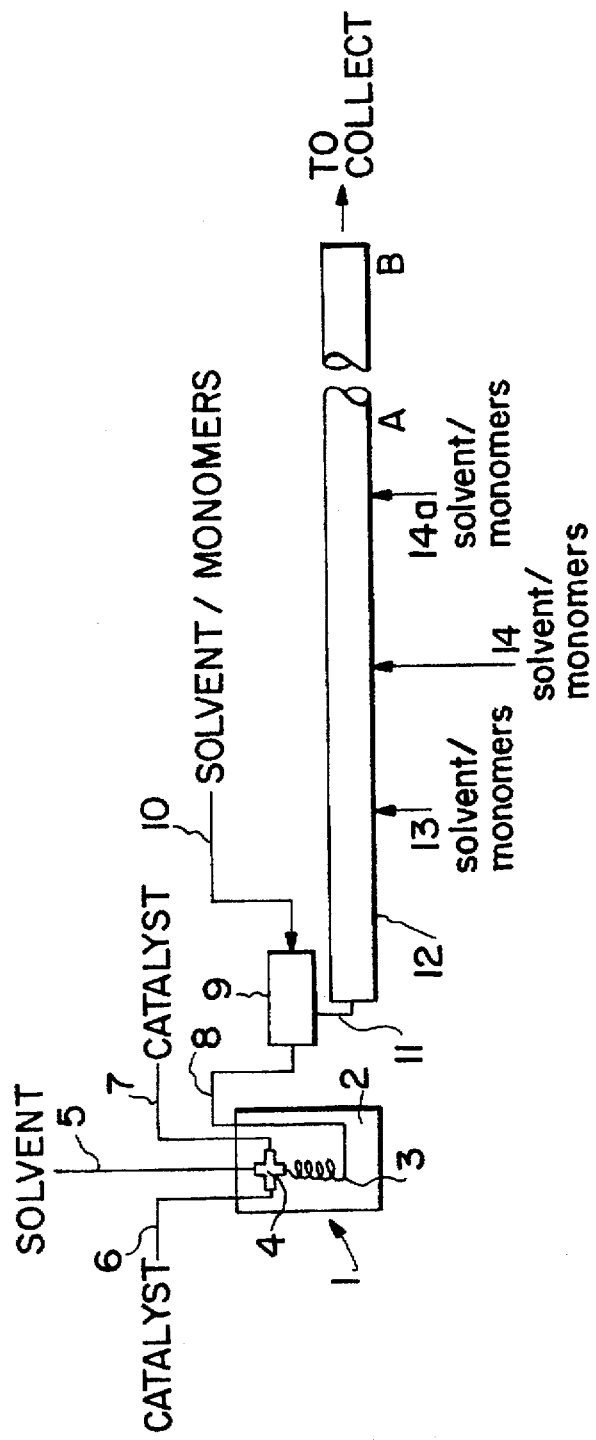
FIG. 6 is a schematic representation of a process for producing polymer in accordance with our invention.

In a preferred embodiment, with reference to the process flow diagram in FIG. 6, the premixing device 1 comprises a temperature control bath 2, a fluid flow conduit 3 and mixing device 4 (e.g., a mixing tee). To mixing device 4, are fed hexane solvent, vanadium tetrachloride and ethyl aluminum sesquichloride through feed conduits 5, 6 and 7, respectively. Upon being mixed in mixing device 4, the resulting catalyst mixture is caused to flow within conduit 3, optionally in the form of a coiled tube, for a time long enough to produce the active catalyst at the temperature set by the temperature bath. The temperature of the bath is set to give the desired temperature in conduit 3, at the outlet of the bath. Upon leaving the premixing device, the catalyst solution flows through conduit 8 into mixing zone 9, where it is intimately mixed with a stream containing hexane diluent and the monomer to be incorporated into the A block, in this case ethylene, and which is fed through conduit 10. Any suitable mixing device can be used such as mechanical mixer, orifice mixer or mixing tee. For economic reasons, the mixing tee is preferred. The residence time of the reaction mixture in mixing zone 9, is kept short enough to prevent significant polymer formation therein before being fed through conduit 11 to tubular reactor 12. Alternatively, streams 8 and 10 can be fed directly to the inlet of reactor 12, if the flow rates are high enough to accomplish the desired level of intimate mixing. Stream 10, the hexane with dissolved monomers, may be cooled upstream of mixing zone 9 to provide the desired feed temperature at the reactor inlet.

Tubular reactor 12 is shown with intermediate feed points 13, 14, and 14a where additional monomers (e.g., ethylene, propylene and non-conjugated diene) and/or hexane can be fed to the reactor. The additional feeds are used to control the composition of the block copolymer. The number of side feeds required and the spacing along the reactor length depends on final polymer structure desired. While the reactor can be operated adiabatically, external cooling means such as a cooling jacket surrounding at least a portion of the reactor system 12, can be provided to maintain reaction mixture temperature within desired limits.

Having thus described the above illustrative reactor system, it will readily occur to those of ordinary skill in the art that many variations can be made within the scope of the present invention. For example, the placement and number of multiple feed sites, the choice of temperature profile during polymerization and the concentrations of reactants, can be varied to suit the end-use application.

Functionalization of the Block Copolymers

The polymers produced in accordance with the present invention can be functionalized, i.e., chemically modified, to have at least one functional group present within its structure, which functional group is capable of: (1) undergoing further chemical reaction (e.g. derivatization) with other material/or (2) imparting desirable properties not otherwise possessed by the polymer alone, absent chemical modification. The functional group can be incorporated into the backbone of the polymer or can be attached as a pendant group from the polymer backbone. The functional group typically will be polar and contain hetero atoms such as P, O, S, N, halogen and/or boron. It can be attached to the saturated hydrocarbon part of the polymer via substitution reactions or to an olefinic portion via addition or cycloaddition reactions. Alternatively, the functional group can be incorporated into the polymer by oxidation or cleavage of a small portion of the diene containing portion of the polymer (e.g., as in ozonolysis). Useful functionalization reactions include: maleation, halogenation, "ene" reactions, reactions with a phenol group, reaction at the point of unsaturation with carbon monoxide, reaction by free radical addition or abstraction and reaction by epoxidation or chloroamination.

As indicated, a functionalized polymer is one which is chemically modified primarily to enhance its ability to participate in a wider variety of chemical reactions than would otherwise be possible with the unfunctionalized polymer. In contrast, a derivatized polymer is one which has been chemically modified to perform one or more functions in a significantly improved way relative to the unfunctionalized polymer and/or the functionalized polymer. Representative of such functions are dispersancy and/or viscosity modification in lubricating oil compositions. The derivatized polymers can include the reaction product of the above recited functionalized polymer with a nucleophilic reactant, which includes amines, alcohols, amino-alcohols and mixtures thereof, to form oil soluble salts, amides, imides, oxazolines, reactive metal compounds and esters of mono- and dicarboxylic acids, and anhydrides. Suitable properties sought to be imparted to the derivatized polymer include especially dispersancy, but also multifunctional viscosity modification, antioxidancy, friction modification, antiwear, antirust, antiseal swell, and the like.

Ash-producing detergents can be made using the functionalized polymers of the present invention as exemplified by oil-soluble neutral and basic salts of alkali or alkaline earth metals with alkyl phenols, alkyl sulfonic acids, carboxylic acids, or organic phosphorus acids characterized by at least one direct carbon-to-phosphorus linkage such as those prepared from the functionalized olefin polymer of the present invention with a phosphorizing agent such as phosphorus trichloride, phosphorus heptasulfide, phosphorus pentasulfide, and sulfur, white phosphorus and a sulfur halide, or phosphorothiotic chloride. Preferred ash-producing detergents which can be derived from the functionalized polymers of the present invention include the metal salts of alkyl sulfonic acids, alkyl phenols, sulfurized alkyl salicylates, alkyl naphthenates and other oil soluble mono- and dicarboxylic acids.

The derivatized polymer compositions of the present invention, can be used as ashless dispersants in lubricant and fuel compositions. Various types of ashless dispersants can be made by derivatizing the polymer of the present invention and are suitable for use in the lubricant compositions. The following are illustrative:

1. Reaction products of functionalized polymer of the present invention derivatized with nucleophilic reagents such as amine compounds, e.g. nitrogen containing compounds, organic hydroxy compounds such as phenols and alcohols.
2. Reaction products of the polymer of the present invention functionalized with an aromatic hydroxy group and derivatized with aldehydes (especially formaldehyde) and amines especially polyalkylene polyamines, through the Mannich reaction, which may be characterized as "Mannich dispersants".
3. Reaction products of the polymer of the present invention which have been functionalized by reaction with halogen and then derivatized by reaction with amines (e.g. direct amination), preferably polyalkylene polyamines.

The functionalized polymers, particularly acid functionalized polymers, of the present invention can be reacted with alcohols, e.g., to form esters. Procedures are well known for reacting high molecular weight carboxylic acids with alcohols to produce acidic esters and neutral esters. These same techniques are applicable to preparing esters from the functionalized polymer of this invention and the alcohols described above. The hydroxy aromatic functionalized polymer aldehyde/amino condensates useful as ashless dispersants in the compositions of this invention include those generally referred to as Mannich condensates. A useful group of Mannich Base ashless dispersants are those formed by condensing phenol functionalized polymer with formaldehyde and polyethylene amines, e.g., tetraethylene pentamine, pentaethylene hexamine, polyoxyethylene and polyoxpropylene amines, e.g., polyoxypropylene diamine and combinations thereof.

A useful class of nitrogen containing condensation products for use in the present invention are those made by a "2-step process" as disclosed in U.S. Pat. No. 4,273,891. Condensates made from sulfur-containing condensates are described in U.S. Pat. Nos. 3,368,972; 3,649,229; 3,600,372; 3,649,659; and 3,741,896 These patents also disclose sulfur-containing Mannich condensates. Useful reactive metals or reactive metal compounds are those which will form metal salts or metal-containing complexes with the functionalized polymer.

The polymer of the present invention may be used as a component of synthetic base oil. The functionalized polymer, in addition to acting as intermediates for dispersant manufacture, can be used as a molding release agent, molding agent, metal working lubricant, thickeners and the like. The additives of the present invention are primarily useful in lubrication oil compositions which employ a base oil in which the additives are dissolved or dispersed thererin. Such base oils may be natural or synthetic. Base oils suitable for use in preparing the lubrication oil composition of the present invention include those conventionally employed as crankcase lubricating oils for spark-ignited and compression-ignited internal combustion engines, such as automobile and truck engines, marine and railroad diesel engines, and the like.

Lubricating oil formulations containing the additives of the present invention conventionally contain other types of additives that contribute other characteristics that are required in the formulation. Typical of such other additives are detergent/inhibitors, viscosity modifiers, wear inhibitors, oxidations inhibitors, corrosion inhibitors, friction modifiers, foam inhibitors, rust inhibitors, demulsifiers, lube oil flow improvers, and seal swell control agents, etc.

APPLICATIONS

Use in Lubricating Oils

The novel block copolymers of the invention may be used as viscosity modifiers or with suitable functionalization and/or derivatization, as multifunctional viscosity modifiers, and as dispersants, for lubricating oils. From studies of hydrogenated block polymers of polyisoprene and polybutadiene, those of ordinary skill in the art are aware that such structures lead to good viscosity-temperature behavior (Ver Strate, G., Struglinski, M., "Polymers as Rheology Modifiers," Schulz, D. & Glass, J., ed. ACS Symp. 462, p. 257, 1991). Use of block copolymers are disclosed in U.S. Pat. 4,959,436, which has been previously incorporated by reference for purposes of U.S. patent practice. With further modification such block copolymers are useful as multifunctional viscosity modifiers as disclosed in U.S. Pat. No. 5,210,146 incorporated herein by reference for purposes of U.S. patent practice.

Copolymer products made in accordance with the present invention when dissolved in oil produce excellent low temperature properties which makes them suitable for lube oil applications. Accordingly, lube oil compositions made in accordance with the present invention preferably have a Mini Rotary Viscosity (MRV) measurement in centipoise (cps) at −25° C. according to ASTM-D 3829 of less than 30,000. A more preferred MRV is less than 20,000, with less than 10,000 being most preferred.

Use as a Thermoplastic Elastomer

Thermoplastic elastomers (TPE's) find use in a many applications. These include shoe soles, sheeting, wire coating, ski boots, flexible ducts and tubing. Desirable characteristics include low modulus, low creep, low permanent set at high tensile strength and extensibility, although there are applications at all modulus levels. Resistance to oxidation and ultraviolet radiation is also important. What the mechanical properties are and how well they are retained as temperature is varied is determined by the proportion of A and B block, how they are coupled, the overall molecular weight of the polymer and the purity of the A-B structure.

Other Uses of Block Copolymers

Plastics Blending

Impact modification of thermoplastics is commonly achieved by forming a rubber/plastic blend composition. For this application, it is desirable to have rubber that is in pellet form. This is accomplished in the case of ethylene/propylene rubbers by adjusting the polymer composition so that it is rich enough in ethylene content to be semicrystalline. At that composition (~70 weight percent ethylene) the glass transition temperature of the polymer is raised by some 10° C. above its value of −55° C. at 45 weight percent ethylene. Because of this elevated $T_g$ and raised modulus due to crystallinity, the blend of polypropylene and EP does not have its optimum lowest ductile-brittle transition. By preparing the polymer of this invention, it is possible to render the polymer pelletizeable via the PE blocks with the elastomeric B block having low $T_g$ which gives optimum low temperature properties. In impact modified blends of high density polyethylene or of polypropylene which can be used in film or other finished goods, it is advantageous to have an agent which stabilizes the morphology of the thermoplastic/rubber blend. Polymers of this invention exhibit compatibilizer activity in such blends. A given small particle size can be obtained with reduced mixing energy and with their morphology stabilized against ripening or coarsening.

Fuel and Heating Oils

Fuel and heating oils contain wax which plugs pipes and filters if the wax crystallizes into anisotropic needles or platelets. The polymers of this invention with an oil soluble B block and a PEA block which nucleates wax crystallization cause granular crystals to form when added to waxy fuels or heating oil, which crystals do not plug the delivery system.

Bitumen Modification

The bitumen employed in asphalt paving flows during service leading to "rutting" on highways. This problem can be eliminated by incorporating polymers to provide resilience. The polymers of the present invention are useful in this application as they can be supplied as pellets or crumbs. Once in the asphalt, the PE blocks provide reinforcement and physical crosslinks to give the binder an elastic network-like response.

Hot Melt Adhesives

Block polymers are employed in hot melt adhesives. Heretofore, it has not been possible to obtain polyethylene/propylene polymers with softening points above 100° C. which also maintains a low Tg. PE/EP block polymers of this invention can provide such performance.

The preferred embodiment of the present invention and the preferred methods of making and using it have been detailed above. Those reading the embodiments should understand that the above description is illustrative, and that other embodiments of the invention can be employed without departing from the full scope of the invention as set forth in the claims that follow.

The invention is further described by the following examples:

Preparation of Uncoupled Block Polymers

EXAMPLE 1

Polymerization was carried out in a 0.793 cm diameter tubular reactor with hexane as the reaction diluent. The reactor contained a series of feed inlets along its length. In this example, A B block polymers are formed. The A block is polyethylene (PE) and in runs 1A and 1B the B block is an ethylene/propylene copolymer (EP). In runs 1C and 1D the B block has an EP segment and an additional ethylene propylene diene monomer (EPDM) tip segment. In runs 1C and 1D the EPDM segment was created in the portion of the B block farthest from the PE-EP junction. These polymers were produced using $VCl_4$ catalyst and $Al_2Et_3Cl_3$ (EASC) co-catalyst. The catalyst and co-catalyst were fed into a mixing tee as dilute solutions in hexane at a temperature of 10° C. After mixing, the combined catalyst components flowed through a tube with a residence time of 10 seconds at 10° C. before entering the reactor. The monomer feed to the reactor inlet was a solution of ethylene in hexane at 20° C. which was mixed with the catalyst stream to start the polymerization. The reactor was operated adiabatically so that temperature increased along its length.

After a residence time of 0.024 minutes, during which the block A (polyethylene) was formed, a feed of ethylene and propylene dissolved in hexane was added via a sidestream injection point to begin polymerization of the B block. Two more ethylene-propylene side feeds were added at residence times of 0.064 and 0.1 minutes to increase the length of the B block. To make a diene containing segment at the tip of the B block, a feed of diene (ethylidene norbornene (ENB)) in hexane was added at a residence time of 0.14 min. The polymerization was quenched with isopropanol at the end of the reactor. The final reaction temperature was 22° C.

In Examples 1A and 1B no diene was used and the polymerization was quenched at 0.14 min. In Examples 1C and 1D, a diene containing side feed was added to make a segment with diene at the tip of the B block and the reaction was quenched at 0.18 minutes. Feed rates and polymerization conditions for these runs are shown in Table 1.

Runs 1A and 1B

A number of polymerization experiments were carried out at the conditions used in runs 1A and 1B, but with a polymerization quench injected into the reactor at a residence time of 0.024 min. so that only polyethylene was produced. From the amount of polymer collected in a known period of time, it was determined that close to 100% of the ethylene fed to the reactor in the main flow had reacted to form polyethylene. Thus in Examples 1A and 1B, the rate at which the polyethylene A block is produced is equal to the feed rate of ethylene in the main flow. The rate at which the elastomeric B block is produced can be found by subtracting the A block production rate from the measured total polymerization rate. The percentages of A and B block in the polymer are then calculated by dividing the respective polymerization rates of these blocks by the total polymerization rate. The average ethylene content of the polymer is equal to the ethylene content of the A block, which is 100%, times the fraction of the A block in the polymer, plus the ethylene content of the B block times the fraction of B block in the polymer. Thus the ethylene content of the B block can be calculated from the measured average ethylene content of the whole polymer and the polymerization rates from the equation:

Ethylene content of B block, weight percent=(average polymer % ethylene content−100×weight fraction of A block in the total polymer)/weight fraction of B block in the total polymer (all terms are in weight units)

The ethylene content of the entire polymer was determined by infrared spectroscopy using the calibration described in I. J. Gardner, C. Cozewith, and G. Ver Strate *Rubber Chemistry and Technology*, vol. 44, 1015, 1971.

Runs 1C and 1D

Two additional runs, 1C and 1D, were performed in a manner similar to runs 1A and 1B, respectively, except that a feed of ethylidene norbornene (ENB) in hexane was added at residence time of 0.14 minutes. The total residence time was extended to 0.18 minutes to allow formation of a diene-containing segment in the B block. Feed rates and polymerization conditions for these runs are shown in Table 1.

The polymerization rate of the EPDM segment located at the end of the chain (tip of the B block) in run 1C can be calculated by subtracting the polymerization rate in the absence of the diene feed to the reactor, as measured in run 1A, from the total polymerization rate measured in run 1C. Similarly, the polymerization rate of the EPDM segment in run 1D is obtained by subtracting the polymerization rate for run 1B from the rate in 1D. Since the polymerization rates for the A block and the segment or portion of the B block without diene are known from the data in Examples 1A and 1B, it is possible to calculate the fractions of the two different types of block and two different segment compositions within the B block in the polymer: the polyethylene A block, the segment of the B block without diene, and the segment of the B block with diene. The diene content in the EPDM segment can be calculated from the average diene content measurement for the whole polymer, (the whole polymer diene content is determined by infrared spectroscopy) from the relationship:

Diene content of the EPDM segment, weight percent=average diene content weight percent/weight fraction of EPDM segment in the chain.

Figure 2:
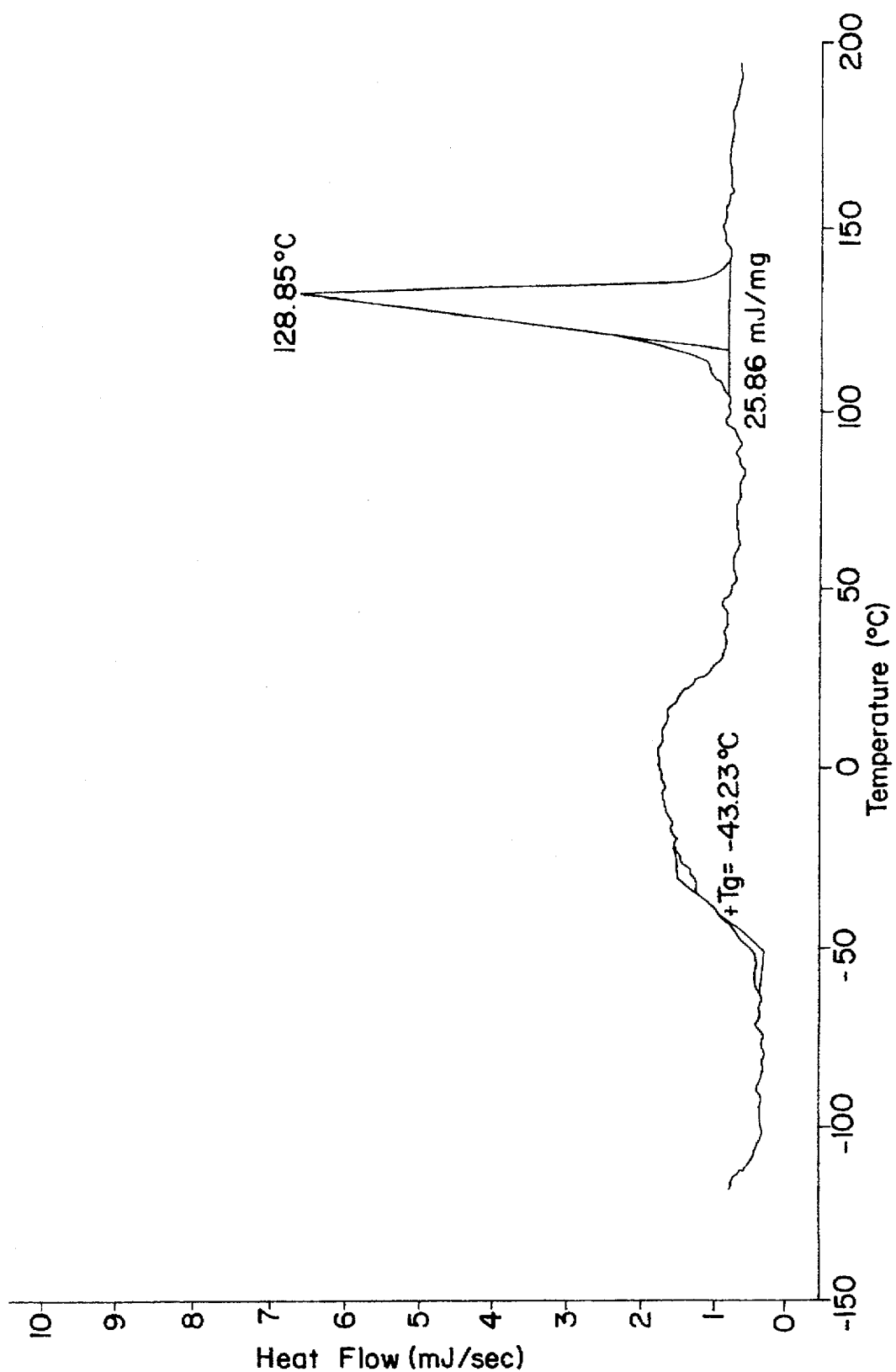
FIG. 2 is a DSC thermogram for polymer 1D described in Example 1.
Figure 5:
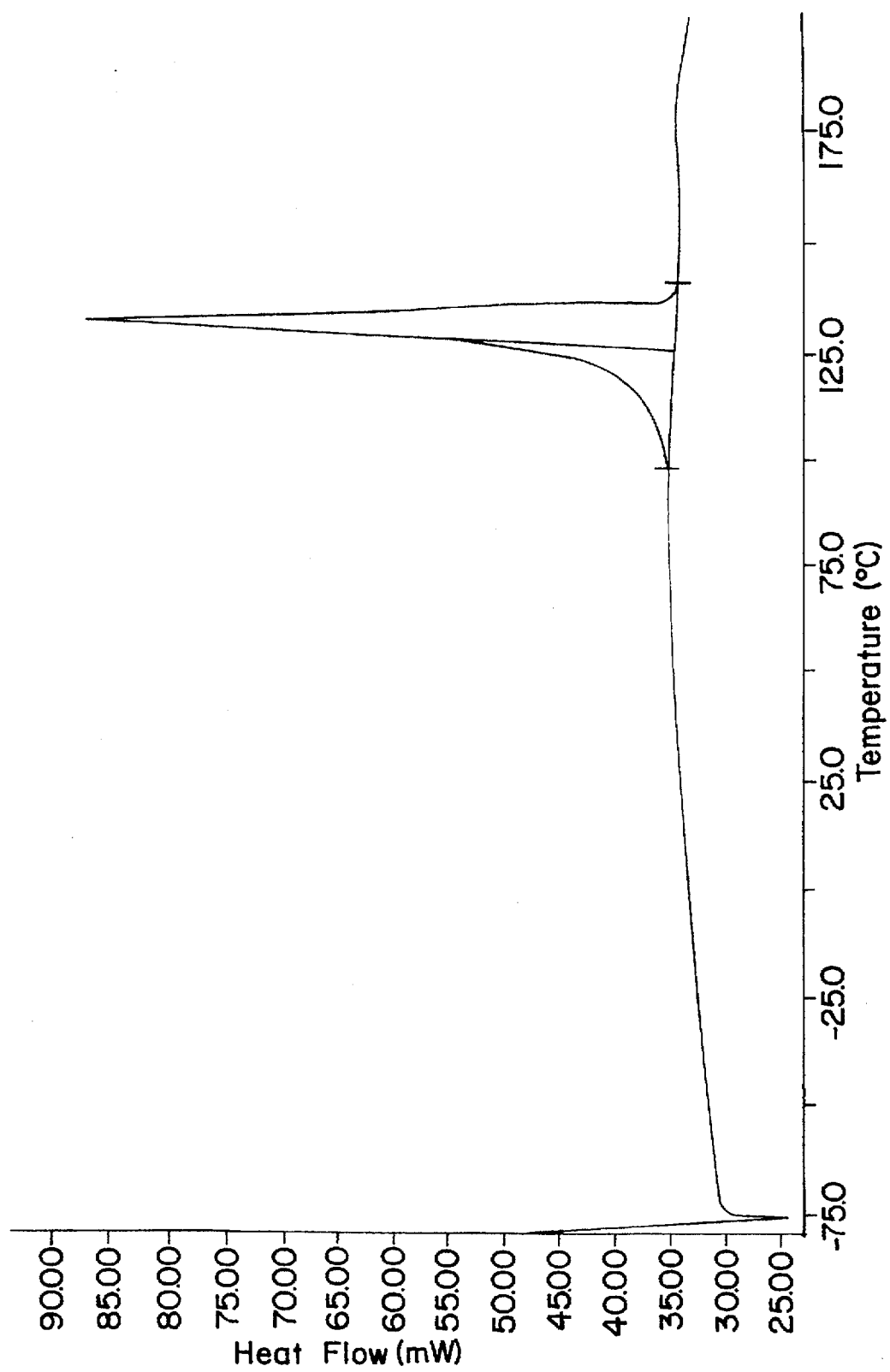
FIG. 5 is a DSC thermogram of a pure polyethylene A block.

The calculated polymer composition is shown in Table 2 along with other measurements of the polymer structure. Of particular note is the narrow MWD of the polymers. The low solubility of the polymer at 22° C. in hexane indicates the absence of large amounts of B-only blocks, or alternatively stated the presence of a high proportion of A B blocks. This low solubility indicates that most of the EP block is attached to the PE block. To demonstrate this point, if a blend of polyethylene homopolymer (PE) and ethylene propylene copolymer (EP) is made, with 35 weight percent PE and 65 weight percent amorphous EP, hexane will extract 65 percent of the blend because the EP is not chemically attached to the PE. DSC analysis of polymer 1C and 1D (see FIGS. 1 and 2) indicate melting at 129° C., at the maximum in the endotherm, which is characteristic of the melting range of polyethylene. A DSC scan of pure polyethylene polymerized in the same manner as the A block of the A-B polymers indicates melting at 134° C. as shown in FIG. 5. Attaching an EP block to the PEA block appears to have lowered the melting temperature slightly. The depression of the melting point is an indication that the PE segment of the A B structure has been incorporated into a block polymer. Simple blending of pure PE with EP does not lower the PE melting temperature.

Tensile properties of the polymers produced were determined in the following manner. A sheet of polymer 15×15× 0.2 cm was prepared by compression molding for 15 minutes at 150° C. An aluminum mold was used with Teflon® coated aluminum foil used as a release agent. Dumbbell-type specimens were die cut from the sheet. These specimens in turn were strained in tension at a crosshead speed of 12.5 cm/min. Initial jaw separation was 5 cm. with about 3.3 cm of the specimen undergoing most of the deformation between the fiducial marks. Data were collected at 20° C. Engineering modulii were calculated as force at a given percent elongation divided by the original unstrained specimen cross-sectional area.

Table 3 shows the modulii and tensile strength of the polymer for runs 1A, 1B, 1C and 1D. The mechanical properties are a function of molecular weight and the polyethylene block content. The modulus of the polymers containing the larger amount of PE block (1A and 1C) are slightly higher than those with a somewhat lower polyethylene block content (1B and 1D). None of the polymers is particularly strong although 1B and 1D which have the higher molecular weights have higher tensile strength.

EXAMPLE 2

Coupling Block Copolymers After Fabrication

The polymers produced in Example 1 were reacted with $SCl_2$ as a coupling agent to couple the chains and produce nodular block polymers, which have much improved TPE properties over the A B precursors made in Example 1.

Dumbbells which were cut from sheets as described in Example 1 were placed in a jar which contained a smaller jar containing $SCl_2$. The vapor space in the large jar was thus saturated with $SCl_2$ at 20° C. After 18 hours of exposure, which ensured that the $SCl_2$ had adequate opportunity to diffuse to the center of the specimen, the specimens were removed from the jar. They were then placed under vacuum at 40° C. for another 18 hours to remove unreacted $SCl_2$. The dumbbells were then tested as described above. The results are shown in Table 3 (where Examples 2A through 2D were produced by coupling the samples in Examples 1A through 1D, respectively). It can be seen from these tests that tensile strength for sample 2A and 2B changes very little from the values for 1A and 1B. For samples 2C and 2D the tensile strength of these coupled polymers was higher than for the uncoupled polymer samples, 1C and 1D. Reacting diene free polymers (Examples 1A and 1B) with $SCl_2$ produced substantially no change in physical properties. For the diene containing polymers, the tensile strength increased dramatically (by over 400% for sample 2D). The coupled polymers can be refabricated into sheets or other shapes with no loss in properties. Thus they are thermoplastic elastomers. This points out the very important feature of the present invention that even after chemical coupling the polymers may be subsequently melt-fabricated. With chemical crosslinking of conventional EPDM elastomers, this is substantially not possible.

EXAMPLE 3

A second series of polymerization runs were conducted following the procedures outlined in Example 1. The initial monomer feed to the reactor contained only ethylene to produce the polyethylene A block, two side stream feeds were then added to make the B block. A final feed was introduced with a high ethylene content to produce a semi-crystalline EP segment at the end or tip of the B block. Reaction conditions for runs 3A and 3B are shown in Table 1. In example 3A, a higher initial ethylene feed rate was used than in Example 3B to give the polymer a higher molecular weight and a greater percentage of A block.

Figure 3:
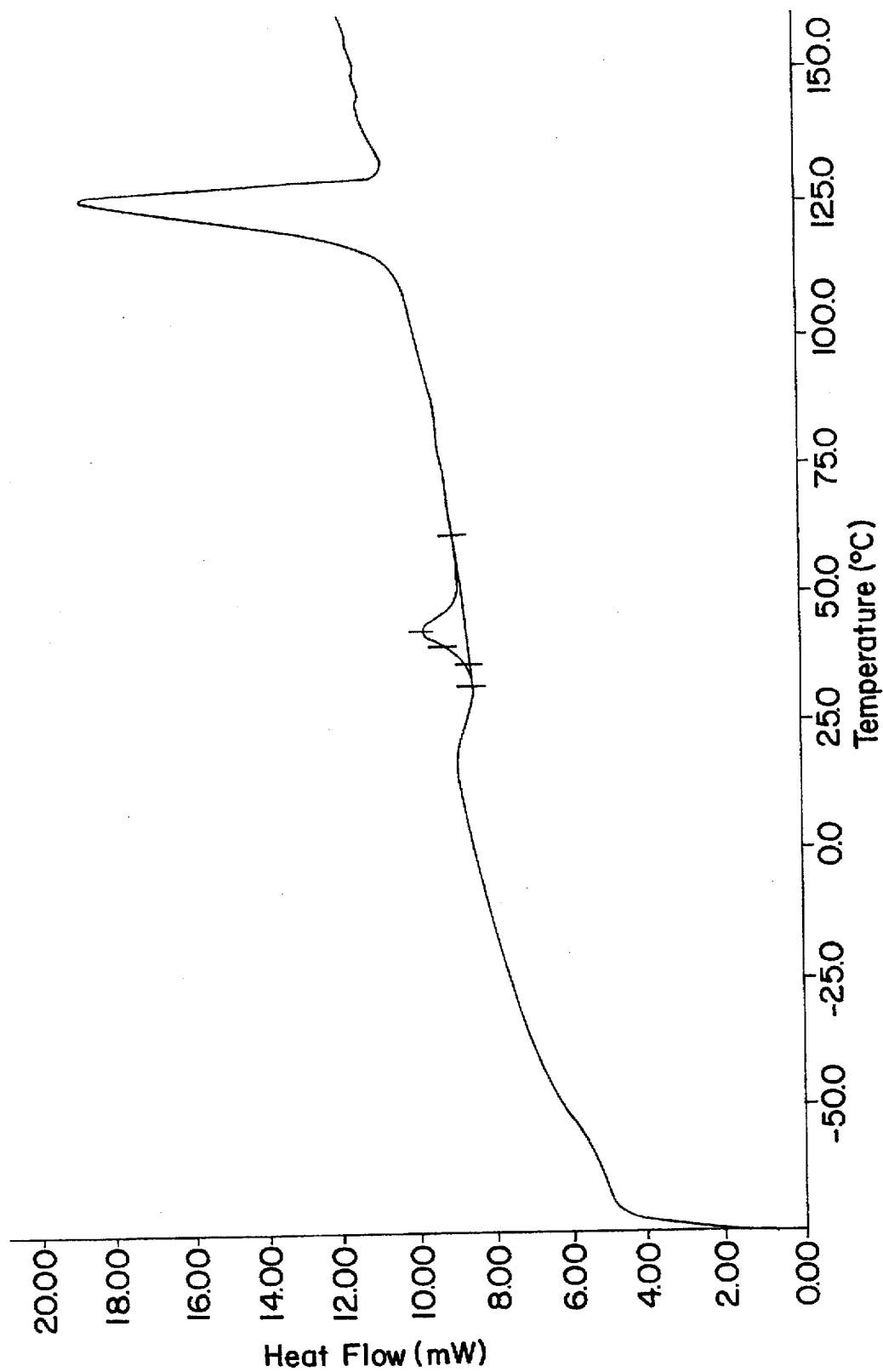
FIG. 3 is a DSC thermogram for polymer 3A described in Example 3.
Figure 4:
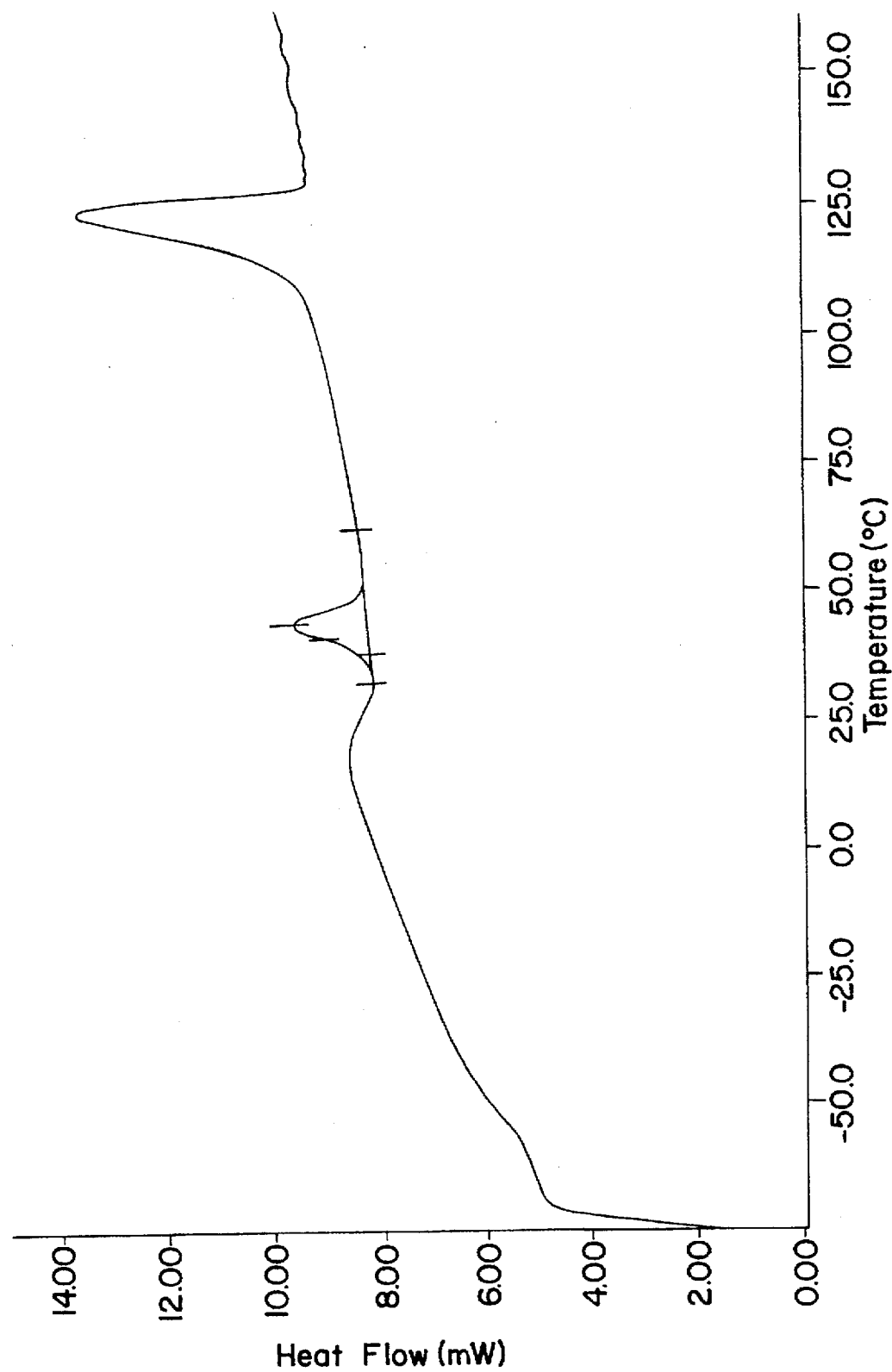
FIG. 4 is a DSC thermogram for polymer 3B described in Example 3.

These polymers were characterized in a manner similar to the polymers produced in Example 1. The results of these analyses are listed in Table 2. The semicrystalline end segment of the B block of Example 3A averaged 72.2 weight percent ethylene, while the semicrystalline end segment of the B block of Example 3B averaged 70 weight percent ethylene. DSC analysis of the polymers, as shown in FIGS. 3 and 4, show that the polymers contain a semi-crystalline fraction melting at about 42° C. in addition to a polyethylene fraction which melts at 122° to 124° C. Table 3 shows results of coupling of Examples 3A and 3B.

Comparitive Example 4

Sample 4A is a standard commercial ethylene/propylene/ diene terpolymer sold under the trade name VISTALON® 7000 by the Exxon Chemical Company. The polymer contains 70 weight percent ethylene and its physical properties are listed in Table 3. The significant difference between this commercial polymer and those of the invention is that with the commercial polymer exposure to coupling agents forms a non-reversible crosslinked network after which crosslinking the polymer cannot be further processed.

EXAMPLE 5

In this example analyses for PE block content and yield of A B block polymer as a percentage of the total product are described. Three A B block copolymers with a diene containing segment in the B block, were produced by the procedure described in Example 1. The process data and polymer analysis are given in Table 4. In Examples 5A to 5C, the feed rates of monomers were adjusted to give increasing amounts of the polyethylene A segment. Nearly 100% of the ethylene has reacted by the time that the first ethylene/propylene side stream feed is added to make the elastomeric B block. Thus, the weight percent of A block in a polymer can be estimated by dividing the ethylene feed rate in the main flow to the reactor inlet by the total polymerization rate. We can also estimate the amount of A block by dividing the heat of fusion measured by DSC over the melting range of 80° C. to 135° C., by the heat of fusion measured by DSC for a pure polyethylene A block of approximately the same molecular weight, as shown in FIG. 5, made by adding only an ethylene feed to the reactor. A value of 181 J/g. is used for the heat of fusion of polyethylene based on averaging the results from a number of samples. As shown in Table 5, these estimates of the amount of the A block are in agreement. In the calculations to follow however, the A block percentages based on the heat of fusion are used. These ranged from 31 to 49% in samples 5A to 5C.

The three polymer samples, 5A to 5C, were fractionated in a Kumagawa apparatus. In this apparatus an individual sample is sequentially extracted with a series of solvents of increasing boiling point. For each solvent continuous extraction is carried out until all soluble polymer is dissolved. The solvents used and their boiling points (bp) were: n-hexane (bp=69° C.), cyclohexane (bp=81° C.), n-heptane (bp=98° C.), and toluene (bp=111° C.). The polymer soluble in each solvent was recovered, weighed, and analyzed by DSC with the results shown in Table 5. In sample 5A, 15.9% of the total polymer was soluble in hexane and that portion had a PE block content of 3.0%. Thus, approximately 97% of this hexane fraction was non-crystalline EP block, or 0.97×15.9= 15.4% of the total polymer. This presumably was not attached to a PE block and thus represents non A B block polymer yield in the polymerization. The remaining fractions all had a PE block content of about 30%. Since the EP or B block constituted 68.8 weight percent of the whole polymer, a fraction of (68.6–15.4)/68.6 or 77.6% of the EP polymerized was attached to a PE block segment. Similar calculations for polymers 5B and 5C reveal that 71.8% and 82.1%, respectively, of the ethylene and propylene copolymerized formed the desired A B block structure.

EXAMPLE 6

Using the procedure of Example 1, a series of runs was made, as shown in Table 4, in which the amount and location of the diene (ENB) feed was varied. In example 6A, ENB was added with the first ethylene/propylene side stream at a residence time of 0.024 minutes. In this case, diene is distributed along the entire length of the B block. Then in Example 6B ENB was added with the second ethylene/ propylene feed, at a residence time of 0.065 minutes to produce an A B block polymer with a diene segment in the B block in which the EPDM segment is located away from the A B junction. In Example 6C, the ENB was added after the second ethylene/propylene side stream at 0.106 minutes residence time, to further displace the diene containing segment from the A B junction point. As shown by the results in Table 4, the ENB content of the polymer dropped from a high in run 6A to lower content in runs 6B and 6C as the ENB feed point was moved further downstream. The percentage of the diene containing segment in the B block is also decreased by later injection of diene. In run 6D, the ENB feed rate was increased from 10 to 15 g/hr which caused ENB content to rise from 0.44 to 0.59 weight percent of total polymer. Adding the same amount of ENB, but later (at 0.143 minutes residence time), resulted in a decrease in ENB content in the polymer in run 6E.

These polymers were coupled by exposure to sulfur dichloride, and the physical properties were measured as described in Example 1. The results are shown in Table 6.

Comparing the results for Examples 6A through and 6D indicates that elongation is increased as the EPDM segment is made shorter and at lower polymer ENB (6C lower than 6D) content, which can be explained by a decreased number of coupling points which allows for more ultimate chain orientation and less stress build-up locally in the matrix at low elongation so that failure crack growth is retarded. However, if the diene segment is too short, not enough coupling occurs for good physical properties, as in example 6E.

When each of this series of samples was mixed in a Banbury mixer with carbon black and oil, as will be described in Example 10, samples 6A and 6B were poorly mixed with a dull appearance as if they were "scorched". It will be apparent to those skilled in the art, that the EPDM segment of the B block must be of a proper size and placement to obtain useful properties and avoid loss of thermoplastic elastomer characteristics because of excessive cross-linking of the soft segments.

EXAMPLE 7

A polymerization was carried out by the procedure described in Example 1, however with a different diene. In Example 7A, 2-vinyl norbornene (VNB) was added to the reactor at a rate of 10.3 g/hr after 0.107 min. residence time. As shown in Table 7, the product polymer contained 0.13 weight percent VNB. Diene content was measured by FTIR. Example 7B was polymerized at the same conditions as 7A, except that the VNB feed rate was raised relative to 7A to produce a polymer with 0.45 weight percent VNB. In Example 7C, the same VNB flow rate as run 7B was maintained, but the VNB was added later than in example 7B, after 0.127 min. residence time. The product from this run contained 0.22 weight percent VNB. The coupled polymers had mechanical properties similar to coupled polymers in which the diene was ENB.

EXAMPLE 8

A polymerization was carried out by the procedure in Example 1 with vanadium dihexanoate monochloride as the catalyst and ethyl aluminum sesquichloride as the co-catalyst. The catalyst and co-catalyst were premixed for 10 seconds at 9° to 10° C. to form an active catalyst. As shown in Table 8, side stream feeds were added to the reactor at 0.026, 0.072, and 0.15 min. to form a B block containing an EPDM segment at the B block extremity. In runs 8A to 8D, the amount of ethylene in the side streams was gradually increased. In run 8A, the first side stream contained only propylene. The percentage of A block in the polymers ranged from 23 to 30%.

At the conditions used in this run, DSC measurements indicate that on average, only 44.5% of the ethylene in the main feed was converted to a polyethylene A block. The unconverted ethylene in the main feed supplemented the monomers in the side streams to increase the polymerization rate and ethylene content of the B block. DSC measurements also indicated an increasing amount of EP crystallinity in the B block in the series of Examples 8A through 8D as the ethylene feed rate in the side streams was increased.

EXAMPLE 9

A block copolymer made in accordance with Example 6D and coupled in accordance with the procedure shown in Example 2 was formulated into a rubber roofing compound in a Banbury mixer. The compound consisted of the block polymer, 100 parts; N550 black, 105 parts; Sunpar 2280 oil, 65 parts. The formulated polymer was tested against and results compared to a fully cured EPDM; a 50/50 mixture of a commercial EPDM (Vistalon® V744 available from Exxon Chemical Company) and a commercial high density polyethylene; and Kraton® 1652 G, a styrenic block copolymer available from Shell Chemical Company. The results are compared in Table 9.

EXAMPLE 10

This example demonstrates that conventional sulfur accelerator vulcanization agents can be used to couple the block polymers of the present invention and that once coupled with these agents, they remain processable or reprocessable thermoplastic elastomers.

Sample 11A prepared as shown in Table 8 is banded on a heated 2-roll mill (15.24 cm×40.64 cm) at approximately 140° C. At this temperature, the polyethylene blocks melt and the rubber becomes transparent and bands well on a mill. Conventional sulfur-accelerator ingredients were mixed into the rubber over a period of about four minutes. The proportions are as follows: 100 g. rubber, 1.25 g. sulfur, 1.0 g. mercaptobenzothiazole, 0.6 g. tetramethylthiuramdisulfide, 0.6 g. butylzymate, 5.0 g. zinc oxide, and 1.0 g. stearic acid.

This amount of curative (e.g. moles of sulfur) exceeds the molar amount of ENB in the polymer several fold. The polymer was analyzed in a Monsanto curemeter at 160° C., 3° arc, 10 Hz for 30 minutes. The viscosity of the block polymer increases over a period of about 20 minutes and then levels off. This corresponds to the standard cure time for a statistical EPDM with ENB as diene (Example 4 above) and this combination of olefin coupling agents. The final $M_H$(curemeter torque at maximum) was approximately 5.6 Nm (50 in-lbs). This corresponds to a complex shear modulus of about $5.5 \times 10^6$ dynes/cm$^2$.

Another portion of the mill mixed polymer was compression molded into a 15 cm×15 cm×0.19 cm pad and heated in an electric press for 20 minutes at 160° C. Dumbbell specimens were cut from the pad and tested as above yielding the properties shown in Table 10. These are similar to those for the polymers treated with $SCl_2$. Various methods can be used to form essentially the same nodular block polymers from the A B precursors. Like the $SCl_2$ coupled polymers, the sulfur-accelerator coupled materials can be fabricated into finished goods after they are coupled. They are thermoplastic elastomers.

Comparative Example 11

In this example, mechanical property data for two commercially available thermoplastic elastomers, Kraton G® and Santoprene®, are compared with the A B block copolymers of the present invention. Sheets of materials measuring 15×15×0.2 cm were fabricated by compression molding at 150° C. for Kraton G and selected polymers from Example 13. Sheets of Santoprene were prepared at 200° C. The pressing time was 15 minutes in order to relax molding stresses. Dumbbell specimens were died from the sheets and tested in tension on a Monsanto Tensometer with environmental chamber. Results of testing are presented in Table 12.

EXAMPLE 12

In this example, a number of A B block polymers made by the procedure in Example 1, but over a broad range of reaction conditions, are tested for solubility in hexane at 22° C. The purpose of this testing is to determine how much B block is unconnected to an A block. The composition and molecular weight of the polymers vary widely. Solubility is determined by pressing 2.0 g of the block polymer onto a 20 mesh screen and immersing the polymer and screen in 200 cc of n-hexane. Wide-mouthed bottles were used and were occasionally swirled over a period of 3 to 5 days. The screen is removed and dried to constant weight in a vacuum oven to determine the amount of insoluble polymer. The hexane supernatant liquid is evaporated to dryness and the residue is weighed to measure the amount of soluble polymer. The sum of the two fractions showed 100% of the starting polymer is accounted for.

A control sample of a high density polyethylene which was melt blended with EPDM in a Brabender mixing head at 180° C. was also extracted in the same manner. These results are presented in Table 13. In the control blend, all 40% of the EPDM was extractable, showing that the rubber is soluble, even at high PE block content, if it is not attached to a PE block. An infrared analysis showed the soluble material to be over 98% EPDM. PE is not extracted. All of the block polymers of Table 13 show soluble rubber of less than 25%.

EXAMPLE 13

The following procedure was used to determine the amount of polymer without an EPDM tip. The A B block polymers were solution blended with a statistical EPDM, Vistalon® 7000. The blending was done at 110° C. in toluene in weight ratios of A B block polymer to Vistalon 7000 of 1:4, 1:1 and 4:1. When the polymers were dissolved (1 g/100 cc toluene), the hot toluene solution was poured with vigorous stirring into a volume of methanol equal to five times the volume of toluene. The methanol was at 20° C. and the polymer blend precipitated completely. The solvent wetted polymer was collected and dried in a vacuum (2 mm Hg) to constant weight at 60° C. under nitrogen. The supernatant toluene-methanol mix was evaporated to dryness and examined for polymer. Less than 1% of the starting material was collected in all cases studied. The oven-dried "mat" of precipitated polymer blend was exposed to $SCl_2$ vapors at 20° C. for 18 hours to covulcanize the A B block polymer with Vistalon 7000 into an insoluble, cross-linked network. The product was freed from excess $SCl_2$ by evacuation for 18 hours at 40° C. in a vacuum oven (2 mm Hg) purged with nitrogen. This product was then extracted with toluene at its boiling point to dissolve any polymer that was not connected to the network.

All of the A B block polymer having a diene containing segment is coupled into an insoluble rubber network by the Vistalon 7000 and the $SCl_2$. The weight of extractable polymer provides an upper bound on the amount of polymer that did not have an EPDM segment in it. DSC can be performed on the extract to determine what percentage of the soluble fraction is PE. Also, the amount of B block without an EPDM segment can be measured by extraction of the network with hexane, which does not dissolve the PE block polymers. This result combined with the original hexane solubility allows an estimation of all components as noted below:

TABLE 1

| EXAMPLE | 1A | 1B | 1C | 1D | 3A | 3B |
|---|---|---|---|---|---|---|
| MAIN FLOW, g/h | | | | | | |
| hexane | 53803 | 53803 | 53803 | 53803 | 53803 | 53803 |
| propylene | 0 | 0 | 0 | 0 | 0 | 0 |
| ethylene | 151 | 124 | 151 | 129 | 151 | 73 |
| ENB | 0 | 0 | 0 | 0 | 0 | 0 |
| VCl4 | 1.8 | 1.5 | 1.8 | 1.5 | 2.4 | 2.4 |
| Al/V mol/mol | 8 | 8 | 8 | 8 | 8 | 8 |
| SIDE STREAM 1, g/h | | | | | | |
| hexane | 8910 | 8910 | 8910 | 8910 | 8910 | 8910 |

Block Polymer Analysis

| Component Number | Component | Means of Identification | Fraction of Total[1] | Comments |
|---|---|---|---|---|
| 1 | PE | Measured from amount of polymer soluble in hot toluene after network formation minus hexane solubles after network formation. This may also include some of component 2. | $\frac{A-C}{T}$ | The fraction of components 1 & 2 that is PE can be estimated as the heat of fusion of A, which is the total hot toluene soluble, divided by 181 joules/g and multiplied by the ratio of the weights of A/(A–C). |
| 2 | PE-EP | Could be identified separately from component 1 by fractional crystallization. | | |
| 3 | PE-EP-EPDM This is the desired structure. | Insolubles in hot toluene after network formation minus (hexane solubles before network formation minus hexane solubles after network formation). | $\frac{D-B+C}{T}$ | The fraction of component 3 that is PE can be estimated as its heat of fusion divided by 181 joules/g. |
| 4 | EP | Hexane soluble after network formation. | $\frac{C}{T}$ | |
| 5 | EP-EPDM | Components 5 and 6 are measured together as hexane soluble before network formation minus hexane soluble after network formation. | $\frac{B-C}{T}$ | |
| 6 | EPDM | See component 5 | | |

Assumes 98% of the V-7000 is insoluble after network formation.
Code for [1] Actual weights measurable; hot toluene soluble (1 + 2 + 4) = A; hexane soluble before network formation (4 + 5 + 6) = B; this component is measured before the polymer is blended with V-7000
hexane soluble after network formation, 4 = C; insolubles in hot toluene after network formation (3 + 5 + 6) = D; total sample weight = T.

This analysis was performed on eleven different A-B block polymers. The hot toluene extractable polymer ranged from a low of 12% to nearly 100% when the A-B block polymer intentionally contained no diene in the B block.

Inspection of tensile data for these polymers indicates that room temperature tensile strength increases about 0.66 MPa for each 1% decrease in the amount of AB block polymer not containing an EPDM segment.

For sample 338B (in table 13), there was about 15% polymer soluble in hot toluene after $SCl_2$ coupling into the network. For that polymer about 6.0% of the original polymer was hexane soluble as shown in the Table. Therefore, the amount of PE block and PE-EP block without diene must be less than 9% of the original polymer.

Although the present invention has been described in considerable detail with reference to certain preferred versions thereof, other versions are possible. Therefore, the spirit and scope of the appended claims should not be limited to the description of the preferred versions contained herein.

TABLE 1-continued

| EXAMPLE | 1A | 1B | 1C | 1D | 3A | 3B |
|---|---|---|---|---|---|---|
| propylene | 1228 | 1354 | 1228 | 1354 | 1125 | 1125 |
| ethylene | 110 | 148 | 110 | 148 | 122 | 122 |
| SIDE STREAM 2, g/h | | | | | | |
| hexane | 6138 | 6138 | 6138 | 6138 | 5910 | 5910 |
| propylene | 358 | 509 | 358 | 509 | 413 | 413 |
| ethylene | 85 | 110 | 85 | 110 | 130 | 130 |
| SIDE STREAM 3, g/hr | | | | | | |
| hexane | 6217 | 6217 | 6217 | 6217 | 7920 | 7920 |
| propylene | 347 | 405 | 347 | 423 | 510 | 510 |
| ethylene | 80 | 108 | 80 | 108 | 255 | 255 |
| SIDE | | | | | | |

TABLE 1-continued

| EXAMPLE | 1A | 1B | 1C | 1D | 3A | 3B |
|---|---|---|---|---|---|---|
| STREAM 4, g/hr | | | | | | |
| hexane | | | 396 | 396 | | |
| ENB | | | 8 | 8 | | |
| TEMPERATURE, °C. | | | | | | |
| feed | 20 | 20 | 20 | 20 | 19 | 19 |
| reactor outlet | 22 | 22 | 22 | 22 | 25 | 24 |
| RESIDENCE TIME, min. | | | | | | |
| to side stream 1 | 0.024 | 0.024 | 0.024 | 0.024 | 0.024 | 0.024 |
| to side stream 2 | 0.064 | 0.064 | 0.064 | 0.064 | 0.109 | 0.109 |
| to side stream 3 | 0.010 | 0.10 | 0.105 | 0.105 | 0.147 | 0.147 |
| to side stream 4 | | | | 0.139 | 0.139 | |
| Total | 0.139 | 0.139 | 0.176 | 0.176 | 0.183 | 0.183 |
| PROCESS RESULTS | | | | | | |
| wt % $C_2=$ in polymer | 71.6 | 72.9 | 71.3 | 70.8 | 72.2 | 70.1 |
| wt % ENB in polymer | 0 | 0 | 0.18 | 0.16 | 0 | 0 |
| Mooney (1 + 4, 150° C.) | 109 | 91.1 | 105 | 94 | 114 | 131 |
| Mw × 10-3 | 189 | 246 | 206 | 270 | 222 | 209 |
| Mn × 10-3 | 108 | 149 | 108 | 133 | 115 | 106 |
| Mw/Mn | 1.67 | 1.7 | 1.9 | 1.94 | 1.91 | 1.99 |
| Poly Rate, g/h | 387 | 368 | 432 | 511 | 689 | 597 |
| $C2=$ conv, %* | 65 | 54.8 | 72.1 | 73 | 75.6 | 72.2 |
| $C3=$ conv, %* | 5.7 | 4.4 | 6.4 | 6.5 | 9.4 | 8.7 |
| ENB conv, %* | 0 | 0 | 9.7 | 10.2 | 0 | 0 |
| Cat eff, g poly/g $VCl_4$ | 215 | 245.3 | 240 | 340.7 | 297 | 249 |

*conv = conversion

TABLE 2

| Patent Example | 1A | 1B | 1C | 1D | 3A | 3B |
|---|---|---|---|---|---|---|
| Poly rate A block, g/hr | 151 | 124 | 151 | 129 | 151 | 73 |
| Poly rate B block, g/hr | 236 | 244 | 236 | 244 | 319 | 355 |
| Poly rate C block, g/hr | 0 | 0 | 45 | 143 | 259 | 265 |
| A block, wt % | 39.0 | 33.7 | 34.9 | 25.0 | 20.7 | 10.5 |
| B block, wt % | 61.0 | 66.3 | 54.6 | 47.2 | 43.7 | 51.2 |
| C block, wt % | 0 | 0 | 10.4 | 27.7 | 35.5 | 38.2 |
| wt % $C2=$ in whole polymer | 71.6 | 72.9 | 71.3 | 70.8 | 72.2 | 70.1 |
| wt % $C2=$ in B block before final feed | 53.4 | 59.1 | 53.4 | 59.1 | 59.0 | 63.9 |
| wt % $C2=$ in B block after final feed | | | 68.9 | 64.2 | 72.2 | 70.1 |
| wt % ENB whole polymer | | | 0.18 | 0.16 | | |
| wt % ENB in EPDM segment | | | 1.7 | 0.58 | | |
| GPC | | | | | | |
| Mw × 10-3 | 189 | 246 | 206 | 270 | 221 | 209 |
| Mn × 10-3 | 108 | 149 | 128 | 133 | 115 | 106 |
| Mw/Mn | 1.67 | 1.7 | 1.68 | 1.94 | 1.91 | 1.99 |
| DSC Heat of Fusion J/g Total Polymer | | | | | | |
| A block[1] | 48 | 33 | 38 | 25.9 | 29.2 | 21.3 |
| B block[2] | | 0.82 | | | 3.59 | 4.14 |
| Wt. % soluble in n-hexane | | | 4.1 | | 2.3 | 2.6 |

[1] melting at 90–130° C.
[2] melting at 30–90° C.

TABLE 3

| EXAMPLE | 1A | 1B | 1C | 1D | 2A | 2B | 2C | 2D | 3A | 3B | 4A |
|---|---|---|---|---|---|---|---|---|---|---|---|
| 100% MODULUS, MPa | 2.4 | 2.3 | 2.4 | 2 | 3.5 | 2.3 | 3.5 | 2.3 | 2.7 | 2.2 | 1.8 |
| TENSILE STRENGTH AT BREAK, MPA | 3.5 | 9.7 | 3.5 | 10 | 3.9 | 10 | 15.4 | 17.2 | 15.4 | 5.4 | 6.2 |
| EXTENSION AT BREAK, % | 780 | 1220 | 1550 | 1130 | 960 | 1130 | 1020 | 770 | 1090 | 740 | 350 |
| PROCESSIBLE, NOT CROSSLINKED | YES | YES | YES | YES | YES | YES | YES | YES | YES | YES | NO |

TABLE 4

| | EXAMPLE | | | | | | | |
|---|---|---|---|---|---|---|---|---|
| | 5A | 5B | 5C | 6A | 6B | 6C | 6D | 6E |
| | | | | RUN | | | | |
| RUN CONDITIONS | 341A | 347B | 346C | 348A | 348B | 348C | 348D | 348E |
| MAIN FLOW g/h | | | | | | | | |
| hexane | 53803 | 53803 | 53803 | 53803 | 53803 | 53803 | 53803 | 53803 |
| propylene | 0 | 0 | 0 | 0 | 0 | 0 | 0 | 0 |
| ethylene | 183 | 298 | 355 | 252 | 252 | 252 | 252 | 252 |
| $VCl_4$ | 3.2 | 2.6 | 3 | 2.6 | 2.6 | 2.6 | 2.6 | 2.6 |
| Al/V mol/mol | 8 | 8 | 8 | 8 | 8 | 8 | 8 | 8 |
| SIDE STREAM 1, g/h | | | | | | | | |
| hexane | 5940 | 5940 | 5900 | 6676 | 6059 | 6059 | 6019 | 5940 |
| propylene | 1019 | 1144 | 1092 | 1132 | 1137 | 1135 | 1140 | 1139 |

TABLE 4-continued

| | EXAMPLE | | | | | | | |
|---|---|---|---|---|---|---|---|---|
| | 5A | 5B | 5C | 6A | 6B | 6C | 6D | 6E |
| | | | | RUN | | | | |
| RUN CONDITIONS | 341A | 347B | 346C | 348A | 348B | 348C | 348D | 348E |
| ethylene | 142 | 101 | 81 | 100 | 100 | 100 | 100 | 100 |
| diene | 0 | 0 | 0 | 10 | 0 | 0 | 0 | 0 |
| SIDE STREAM 2, g/h | | | | | | | | |
| hexane | 8910 | 8989 | 8910 | 8780 | 9210 | 8870 | 8870 | 9187 |
| propylene | 419 | 427 | 372 | 436 | 426 | 430 | 427 | 430 |
| ethylene | 110 | 100 | 81 | 100 | 100 | 100 | 100 | 100 |
| diene | 0 | 0 | 0 | 0 | 10 | 0 | 0 | 0 |
| SIDE STREAM 3, g/hr | | | | | | | | |
| hexane | 6336 | 6652 | 6257 | 6059 | 6059 | 6455 | 6661 | 6546 |
| propylene | 0 | 0 | 0 | 0 | 0 | 0 | 0 | 0 |
| ethylene | 0 | 0 | 0 | 0 | 0 | 0 | 0 | 0 |
| diene | 8 | 10 | 8 | 0 | 0 | 10 | 15.2 | 15.3 |
| RESIDENCE TIME, min | | | | | | | | |
| to side stream 1 | 0.024 | 0.024 | 0.024 | 0.024 | 0.024 | 0.024 | 0.024 | 0.024 |
| to side stream 2 | 0.113 | 0.066 | 0.066 | 0.065 | 0.065 | 0.065 | 0.065 | 0.065 |
| to side stream 3 | 0.15 | 0.143 | 0.143 | 0.106 | 0.106 | 0.106 | 0.106 | 0.143 |
| Total | 0.188 | 0.181 | 0.181 | 0.178 | 0.178 | 0.178 | 0.178 | 01.78 |
| TEMPERATURE, °C. | | | | | | | | |
| Feed | 20 | 20 | 20 | 20 | 20 | 20 | 21 | 21 |
| Reactor Outlet | 27 | 27 | 27 | 26 | 26 | 27 | 27 | 27 |
| PROCESS RESULTS | | | | | | | | |
| Wt. % C2= in polymer | 68.7 | 71.1 | 74.4 | 75.4 | 75.7 | 75.6 | 74.9 | 73.4 |
| Wt. % ENB in polymer | 0.27 | 0.17 | 0.23 | 1.2 | 0.91 | 0.44 | 0.59 | 0.27 |
| Mooney (1 + 4, 150° C.) | 20.9 | 41.9 | 32.5 | 53.3 | 46.2 | 42.5 | 44.4 | 43.1 |
| Mw × 10-3 | 144 | 185 | | | 208 | 202 | 196 | 162 |
| Mn × 10-3 | 83.8 | 104 | | | 90.2 | 96.2 | 99.4 | 94.5 |
| Mx/Mn | 1.75 | 1.91 | | | 2.04 | 1.86 | 2.01 | 1.91 |
| Poly Rate, g/h | 651 | 658 | 667 | 656 | 662 | 653 | 670 | 670 |
| C2 = conv*, % | 100 | 93.6 | 95.7 | 98.1 | 99.4 | 98.7 | 98 | 98.7 |
| C3 = conv*, % | 14.1 | 12.1 | 11.6 | 10.1 | 10.2 | 10.1 | 10.6 | 11.3 |
| ENB conv*, % | 22 | 11.2 | 19.2 | 78.7 | 60.2 | 28.8 | 25.7 | 11.8 |
| Cat eff, g poly/g VCl$_4$ | 204 | 253.2 | 222.4 | 252 | 255 | 251 | 255 | 257 |

*conv = conversion

TABLE 5

| | Wt. % of Polymer | Heat of Fusion J/g, 120–130° C. | Wt. % PE Based on Ethylene Feed | Wt. % PE Based on Heat of Fusion |
|---|---|---|---|---|
| Sample 5A (341A) | | | | |
| Whole Polymer | 100.0 | 56.8 | 28.1 | 31.4 |
| N-Hexane Soluble Fraction | 15.9 | 5.4 | | 3.0 |
| Cyclohexane Soluble Fraction | 10.7 | 53.7 | | 29.7 |
| N-Heptane Soluble Fraction | 5.5 | 49.9 | | 27.6 |
| Toluene Soluble Fraction | 67.8 | 58.3 | | 32.2 |
| Sample 5B (347B) | | | | |
| Whole Polymer | 100.0 | 69.3 | 45.3 | 38.2 |
| N-Hexane Soluble | 12.0 | 0.0 | | 0.0 |
| Cyclohexane Soluble Fraction | 1.2 | 1.2 | | 0.6 |
| N-Heptane Soluble Fraction | 4.7 | 10.8 | | 6.0 |
| Toluene Soluble Fraction | 82.1 | 72.6 | | 40.1 |
| Sample 5C (346C) | | | | |
| Whole Polymer | 100.0 | 88.0 | 53.2 | 48.6 |
| N-Hexane Soluble | 5.9 | 0.0 | | 0.0 |
| Cyclohexane Soluble Fraction | 1.8 | 1.1 | | 0.6 |
| N-Heptane Soluble | 1.4 | (*) | | |

TABLE 5-continued

| | Wt. % of Polymer | Heat of Fusion J/g, 120–130° C. | Wt. % PE Based on Ethylene Feed | Wt. % PE Based on Heat of Fusion |
|---|---|---|---|---|
| Fraction Toluene Soluble Fraction | 90.8 | 8.6 | | 49.0 |

(*) Insufficient sample for analysis

TABLE 6

| Example | Modulus, 100% | Tensile Strength, MPa | Elongation at Break, % |
|---|---|---|---|
| 6A | BROKE | 5.4 | 36 |
| 6B | 7.6 | 12.4 | 190 |
| 6C | 5.35 | 15.9 | 650 |
| 6D | 5.6 | 15.2 | 580 |
| 6E | 4.8 | 12.3 | 760 |

TABLE 7

Example 7

| | EXAMPLE | | |
|---|---|---|---|
| | 7A | 7B | 7C |
| RUN CONDITIONS | 360B | 360C | 360D |
| MAIN FLOW g/h | | | |
| hexane | 53803 | 53803 | 53803 |
| propylene | 0 | 0 | 0 |
| ethylene | 298 | 298 | 298 |
| diene | 0 | 0 | 0 |
| catalyst | 3 | 3 | 3 |
| Al/V mol/mol | 8 | 8 | 8 |
| SIDE STREAM 1, g/h | | | |
| hexane | 5227 | 6217 | 6109 |
| propylene | 1121 | 1121 | 1121 |
| ethylene | 100 | 100 | 100 |
| diene | 0 | 0 | 0 |
| SIDE STREAM 2, g/h | | | |
| hexane | 8910 | 8910 | 8910 |
| propylene | 429 | 429 | 443 |
| ethylene | 100 | 100 | 100 |
| diene | 0 | 0 | 0 |
| SIDE STREAM 3, g/hr | | | |
| hexane | 6395 | 6748 | 6748 |
| propylene | 0 | 0 | 0 |
| ethylene | 0 | 0 | 0 |
| diene | 10.3 | 20.4 | 20.4 |
| RESIDENCE TIME, min | | | |
| to side stream 1 | 0.024 | 0.024 | 0.024 |
| to side stream 2 | 0.066 | 0.066 | 0.068 |
| to side stream 3 | 0.107 | 0.107 | 0.127 |
| Total | 0.180 | 0.178 | 0.180 |
| TEMPERATURE, °C. | | | |
| Feed | 20 | 20 | 20 |
| Reactor Outlet | 26 | 26 | 26 |
| PROCESS RESULTS | | | |
| Wt. % ethylene in poly. | 76.1 | 77.9 | 76.1 |
| Wt. % VNB in poly. | 0.13 | 0.45 | 0.22 |
| Mooney (1 + 4, 150°) | 44.4 | 54.6 | 41.8 |
| Mw × 10–3 | 202 | 214 | 170 |
| Mn × 10–3 | 107 | 112 | 87.8 |
| Mw/Mn | 1.9 | 1.92 | 1.93 |
| Poly Rate, g/h | 638.65 | 627.7 | 624.3 |
| C2 = conv*, % | 97.47 | 97.0 | 95.2 |
| C3 = conv*, % | 9.8 | 9.2 | 9.5 |
| VNB conv*, % | 8.0 | 13.8 | 6.7 |
| Cat eff, g poly/g cat | 212.8 | 209.2 | 208.1 |

*conv = conversion

TABLE 8

(Examples 8, 9, and 11)

| EXAMPLE | 8A | 8B | 8C | 8D | 9A | 9B | 11A |
|---|---|---|---|---|---|---|---|
| RUN | 392A | 392B | 392C | 392D | 397D | 397E | 361B |
| RUN CONDITIONS | | | | | | | |
| MAIN FLOW g/h | | | | | | | |
| hexane | 49474 | 50134 | 51031 | 49474 | 53605 | 53526 | 53803 |
| propylene | 0 | 0 | 0 | 0 | 0 | 0 | 0 |
| ethylene | 248 | 244 | 250 | 259 | 253 | 253 | 298 |
| diene | 0 | 0 | 0 | 0 | 238 | 1.71 | 0 |
| catalyst | 6.125 | 6.125 | 6.37 | 6.125 | 3.36 | 3.36 | 3.6 |
| Al/V, mol/mol | 7 | 7 | 7 | 7 | | 7 | 8 |

TABLE 8-continued (Examples 8, 9, and 11)

| EXAMPLE | 8A | 8B | 8C | 8D | 9A | 9B | 11A |
|---|---|---|---|---|---|---|---|
| RUN | 392A | 392B | 392C | 392D | 397D | 397E | 361B |
| SIDE STREAM 1, g/h | | | | | | | |
| hexane | 5940 | 5940 | 5940 | 5940 | 6692 | 6692 | 5940 |
| propylene | 1139 | 1140 | 1135 | 1142 | 1234 | 1234 | 1127 |
| ethylene | 0 | 50 | 50 | 100 | 111 | 111 | 100 |
| SIDE STREAM 2, g/h | | | | | | | |
| hexane | 8870 | 8870 | 8870 | 8870 | 9900 | 9900 | 8910 |
| propylene | 413 | 416 | 415 | 415 | 468 | 471 | 420 |
| ethylene | 51 | 50 | 100 | 100 | 112 | 112 | 100 |
| SIDE STREAM 3, g/hr | | | | | | | |
| hexane | 5940 | 5940 | 5940 | 5940 | | | 6415 |
| propylene | 0 | 0 | 0 | 0 | | | 0 |
| ethylene | 0 | 0 | 0 | 0 | | | 0 |
| ENB | 12 | 11.8 | 11.8 | 12 | | | 15.1 |
| TEMPERATURES | | | | | | | |
| Reactor feed, °C. | 20 | 20 | 20 | 20 | 20 | 20 | 20 |
| Reactor outlet, °C. | 27 | 28 | 29 | 29 | 31 | 31 | 27 |
| RESIDENCE TIME, min | | | | | | | |
| to side stream 1 | 0.026 | 0.026 | 0.026 | 0.026 | 0.024 | 0.024 | 0.0242 |
| to side stream 2 | 0.072 | 0.071 | 0.070 | 0.072 | 0.066 | 0.066 | 0.066 |
| to side stream 3 | 0.155 | 0.153 | 0.151 | 0.155 | | | 0.107 |
| Total | 0.195 | 0.193 | 0.19 | 0.195 | 0.142 | 0.142 | 0.179 |
| RUN CONDITIONS PROCESS RESULTS | | | | | | | |
| Wt. % C2 = in polymer | 72.4 | 74.8 | 75.5 | 77.3 | 73.2 | 71.5 | 74.4 |
| Wt. % ENB in polymer | 0.91 | 0.47 | 0.47 | 0.28 | 0.33 | 0.14 | 0.47 |
| Mooney (1 + 4, 150° C.) | 62.4 | 68.2 | 83.7 | 90 | 51 | 49.8 | 24.4 |
| A Block, % of polymer | 29.5 | 30.3 | 23.5 | 24.5 | | | |
| Poly Rate, g/h | 377.7 | 412.4 | 438.9 | 450.9 | 592.5 | 604 | 650 |
| C2 = conv, %* | 90.6 | 89.3 | 82.5 | 75.7 | 980.8 | 90.6 | 96.6 |
| C3 = conv, %* | 6.7 | 6.6 | 6.9 | 6.6 | 9.3 | 10.1 | 10.7 |
| ENB conv, %* | 28.6 | 16.4 | 17.5 | 10.5 | 69.8 | 49.5 | 20.2 |
| Cat eff, g poly/g VCl$_4$ | 61.7 | 67.3 | 68.9 | 73.6 | 176.4 | 179.8 | 181 |
| DSC Heat of Fusion, J/g of Total Polymer | | | | | | | |
| A Block[1] | 53.4 | 54.9 | 42.5 | 44.3 | | | |
| B Block[2] | 0.53 | 2 | 5.3 | 7.2 | | | |

*conv = conversion
[1]melting at 120–130° C.
[2]melting at 40–50° C.

TABLE 9

| | Roof Sheeting Compound* | | | |
|---|---|---|---|---|
| | CURED EPDM | 50 V774 50 HDPE | KRATON 1652G | EXAMPLE 6D |
| Hardness Shore A | | | | |
| 20° C. | 61 | 91 | 68 | 87 |
| 70° C. | 54 | 85 | 63 | 79 |
| 100° C. | 52 | 68 | 52 | 74 |
| 100% Modulus, MPa | 2.8 | 5.6 | 2.0 | 6.0 |
| 300% Modulus, MPa | 7.6 | — | 5.2 | 9.6 |
| Tensile Strength, MPa | 9.3 | 5.7 | 15.2 | 9.6 |
| Elongation, % | 420 | 190 | 400 | 350 |
| Tensile Strength, MPa[1] | No Seal* | 5.1 | 4.9 | 8.4 |
| Tear Strength | | | | |
| Die "C", kN/m | 44 | 19 | 4 | 25 |
| Peel Adhesion, kN/m N/m, Fabric | | | | |
| Reinforced Back, test 0.05 m/min | | | | |
| 20° C. | No Seal** | 0.35 | 6.7 | 2.1 |
| 100° C. | No Seal** | 0.035 | 0.17 | 0.17 |

*Molded sheet, 5 minutes at 300° F.
**To seal thermosets a joint compound must be employed.
[1]heat sealed, (overlapped 2.5 cm, 15 min., 150° C.)

TABLE 9

| | Sample 11A | | |
|---|---|---|---|
| | (1) | (2) | (3) |
| g coupling agent/75 g polymer | 0 | 7.5 | 7.5 |
| 100% modulus (MPa) | 3.9 | 4.9 | 4.8 |
| 300% modulus (MPa) | 4.0 | 6.7 | 7.0 |
| Tensile strength (MPa) | 5.0 | 16.0 | 15.0 |
| Elongation at break (%) | 1050 | 1065 | 950 |

(1) original sample
(2) coupled sample
(3) sample (2) into a new sheet after refabrication

TABLE 11

| EXAMPLE | 14A | 14B | 14C | 14D | 14E | 14F |
|---|---|---|---|---|---|---|
| RUN | 365B | 365C | 367A | 367B | 367C | 372A |
| MAIN FLOW g/h | | | | | | |
| hexane | 52984 | 48206 | 43203 | 49342 | 43520 | 43362 |
| ethylene | 213 | 266 | 180 | 225 | 270 | 270 |
| catalyst | 3 | 3 | 2.5 | 3 | 2.2 | 2.5 |
| Al/V mole/mole | 6 | 7 | 6 | 7 | 9.6 | 6 |
| SIDE STREAM 1, g/h | | | | | | |
| hexane | 5623 | 6098 | 5821 | 5940 | 5940 | 5980 |
| propylene | 0 | 0 | 0 | 0 | 0 | 0 |
| propylene | 1117 | 1129 | 1142 | 1107 | 1107 | 1140 |
| ethylene | 98 | 102 | 98 | 100 | 100 | 100 |
| SIDE STREAM 2, g/h | | | | | | |
| hexane | 9068 | 9266 | 8672 | 8910 | 8791 | 7801 |
| propylene | 401 | 401 | 437 | 426 | 426 | 414 |
| ethylene | 100 | 100 | 100 | 100 | 100 | 100 |
| SIDE STREAM 3, g/h | | | | | | |
| hexane | 6209 | 6336 | 6419 | 6573 | 6454 | 6534 |
| propylene | 0 | 0 | 0 | 0 | 0 | 0 |
| ethylene | 0 | 0 | 0 | 0 | 0 | 0 |
| ENB | 10.2 | 15 | 0.41 | 10.5 | 7.45 | 14.6 |
| TEMPERATURES | | | | | | |
| Catalyst premix | 12.9 | 11.5 | 18.5 | 18.3 | 18.6 | 18.7 |
| Reactor inlet | 25.2 | 18.6 | 24.8 | 19.9 | 15.7 | 24.8 |
| Reactor outlet | 27.8 | 25.3 | 27.1 | 25.6 | 24.5 | 28 |
| RESIDENCE TIME, min | | | | | | |
| to side stream 1 | 0.024 | 0.0270 | 0.0301 | 0.0264 | 0.0298 | 0.0300 |
| to side stream 2 | 0 | 0.1 | 0.1 | 0.1 | 0.1 | 0.1 |
| to side stream 3 | 0.14 | 0.138 | 0.13 | 0.136 | 0.172 | 0.129 |
| Total | 0.18 | 0.196 | 0.214 | 0.194 | 0.216 | 0.214 |
| PRODUCT ANALYSIS | | | | | | |
| wt. % $C_2^=$ in polymer | 70.8 | 70.8 | 73 | 73.2 | 75.8 | 80 |
| wt. % ENB in polymer | 0.33 | 0.4 | 0.28 | 0.25 | 0.07 | 0.43 |
| Mooney (1 + 4, 150° C.) | 36.7 | 48.2 | 77.5 | 47.4 | | 130.7 |

TABLE 12

| Sample | 20° C. 100% Mod. MPa | 20° C. 300% Mod. MPa | 20° C. Tensile Str. MPa | 20° C. % Extension at Break | 60° C. 100% Mod. MPa | 60° C. 300% Mod. MPa | 60° C. Tensile Str. MPa | 60° C. % Extension at Break | 80° C. 100% Mod. MPa | 80° C. 300% Mod. MPa | 80° C. Tensile Str. MPa | 80° C. % Extension at Break |
|---|---|---|---|---|---|---|---|---|---|---|---|---|
| Kraton G | 3.2 | 6 | 26 | 470 | 2.1 | 2.8 | 6.4 | 875 | 1.6 | 1.9 | 2.1 | 510 |
| Santoprene 203-40D | 9.4 | 11.4 | 14 | 410 | | | | | | | | |
| 201-64A | 1.9 | | | | | | | | | | 80 | 1.4 |
| 14A | 3.3 | 4.1 | 12 | 1200 | 2.2 | 2.6 | 2.8 | 370 | | | | |
| 14B | 3.6 | 4.8 | 21 | 900 | 2.3 | 3.1 | 3.7 | 440 | | | | |
| 14B(1) | 3.7 | 5.3 | 17 | 750 | | | | | | | | |
| 14C | 4.1 | 6.5 | 28 | 700 | 2.9 | 4.1 | 10 | 450 | | | | |
| 14D | 3.9 | 6 | 25 | 840 | 2.7 | 3.4 | 4.3 | 560 | | | | |
| 14E | 3.8 | 5.5 | 3.6 | 830 | 2.5 | 3 | 3.9 | 650 | | | | |
| 14F | 6.5 | 9.6 | 25 | 535 | 4.1 | | 7.5 | 630 | | | | |
| Vistalon V-719(2) | 2.9 | 3.4 | 17 | 780 | 0.9 | 1 | 1 | 380 | Too soft to test. | | | |

(1)Refabricated after coupling
(2)Statistical EP copolymer

TABLE 13

| Run | Wt. % C2 = in Poly. | Mn × 10⁻³ | Mw × 10⁻³ | Hexane soluble, % |
|---|---|---|---|---|
| 317a | 68 | 75 | 139 | 12.1 |
| 317b | 68 | 97 | 193 | 13.0 |
| 317c | 71 | 118 | 228 | 4.9 |
| 317d | 69 | 92 | 189 | 12.5 |
| 318a | 63 | 69 | 118 | 22.1 |
| 318b | 62 | 62 | 118 | 23.5 |
| 318c | 64 | 88 | 20S | 16.6 |
| 318d | 66 | 92 | 179 | 16.9 |
| 319a | 66 | 108 | 160 | 13.2 |
| 319c | 68 | 108 | 230 | 7.8 |
| 320a | 71 | 108 | 206 | 4.1 |
| 320c | 70 | 128 | 237 | 3.3 |
| 323a | 72 | 137 | 289 | 2.9 |
| 323b | 71 | 152 | 307 | 2.2 |
| 332a | 68 | 149 | 258 | 11.3 |
| 333a | 68 | 104 | 212 | 7.7 |
| 334a | 69 | 126 | 195 | 4.9 |
| 334b | 67 | 117 | 178 | 8.0 |
| 335a | 66 | 94 | 143 | 10.1 |
| 335b | 70 | — | — | 6.5 |
| 336a | 69 | — | — | 15.2 |
| 336d | 66 | — | — | 19.0 |
| 336e | 69 | 74 | 147 | 3.7 |
| 338b | — | — | — | 6.0 |
| 60% HDPE/ 40% EPDM | — | — | — | 39.6 |
| 40% HDPE/ 60% EPDM | — | — | — | 6.0 |

We claim:

1. A block copolymer comprising an A block and a B block, wherein
    said A block consists of a high polymer of ethylene;
    said B block includes a first polymer segment contiguous to a junction of said A block and said B block, said first polymer segment including ethylene and an alpha-olefin;
    said B block including a tip segment, said tip segment being furthest from said junction, said tip segment being a polymer of ethylene, an alpha-olefin, and a non-conjugated diene, said diene being present in an mount up to about ten mole percent based on the total moles of the monomers of said block copolymer.

2. The block copolymer of claim 1 wherein said block copolymer is polymerized in the presence of a vanadium catalyst system, said catalyst system being a vanadium compound and an organoaluminum compound.

3. A block copolymer comprising an A block and a B block, wherein
    said A block consists of a high polymer of ethylene;
    said B block includes a first polymer segment contiguous to a junction of said A block and said B block, said first polymer segment including ethylene and an alpha-olefin other than ethylene;
    said B block including a tip segment, said tip segment being furthest from said junction, said tip segment being a polymer of ethylene, an alpha-olefin, and a non-conjugated diene, said diene being present in an mount up to about 10 mole percent based on total moles of the monomers of said block copolymer;
    wherein said block copolymer is formed in the presence of a vanadium catalyst system, said vanadium catalyst system having a vanadium compound and an organoaluminum compound.

4. The block copolymer of claim 1 wherein said block copolymer is present at greater than 50 weight percent based on the total weight of polymer as polymerized.

5. The block copolymer of claim 1 wherein said A block has a $T_m$ of at least about 110° C.

6. The block copolymer of claim 2 wherein said vanadium compound is represented by one of the general formulas:

$$VCl_x(OR)_{3-x}; \quad (1)$$

$$VCl_x(COOR)_{3-x}; \quad (2)$$

where x=0 to 3 and R=a hydrocarbon radical;

$$VCl_4;$$

$$V(AcAc)_2;$$

where AcAc=acetyl acetonate;

$$V(AcAc)_3;$$

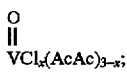

where x=1 or 2; and

where n=2 to 3 and B=Lewis base capable of making hydrocarbon-soluble complexes with $VCl_3$, such as tetrahydrofuran, 2-methyl-tetrahydrofuran and dimethyl pyridine, where R represents a $C_1$ to $C_{10}$ aliphatic, acylic, or aromatic hydrocarbon radical;

wherein the organoaluminum compound is represented by one of the formulas:

| | |
|---|---|
| $AlR_3$ | $Al(OR')R_2$ |
| $AlR_2X$ | $R_2Al$—O—$AlR_2$ |
| $AlR'RX$ | |
| $Al_2R_3X_3$ | |
| $AlRX_2$ | methyl alumoxane | where R and R' represent hydrocarbon radicals, said R and R' being the same or different and wherein X is a halogen selected from the group consisting of bromine, chlorine, and iodine.

7. The block copolymer of claim 1 wherein said non-conjugated diene is present in said B block, in the range of from about 0.03 to about 5 mole percent, based on the total moles of the monomers of said A B block copolymer.

8. The block copolymer of claim 7 wherein said non-conjugated diene is selected from the group consisting of 5-ethylidene-2-norbornene, tetrahydroindene, vinylnorbornene, 5-methylene-2-norbornene, and dicyclopentadiene.

9. The block copolymer of claim 7 wherein said non-conjugated diene is selected from the group consisting of tetrahydroindene; methyltetra-hydroindene; dicyclopentadiene; bicyclo-(2,2,1)-hepta-2,5-diene; alkenyl, alkylidene, cycloalkenyl and cycloalkylidene norbornenes such as 5-methylene-2-norbornene (MNB), 5-ethylidene-2-norbornene (ENB), 5-propenyl-2-norbornene, 5-(4-cyclopentenyl)-2-norbornene, 5-cyclohexylidene-2-norbornene, vinyl norbornene, and norbornadiene.

10. The block copolymer of claim 1 wherein said B block has an intramolecular composition distribution such that at least two portions of the B block, each portion comprising at least 5 weight percent of the B block, differ in composition by at least 5 weight percent ethylene.

11. The block copolymer of claim 1 wherein said B block has an average ethylene content in the range of from about 20 to about 90 mole percent based on the total moles of the monomers of the B block.

12. The block copolymer of claim 1 wherein said alpha-olefin in said B block is propylene.

13. The block copolymer of claim 1 wherein said tip segment is present in said B block at a level up to about 50 weight percent based on the total weight of said B block.

14. The block copolymer of claim 1, wherein said block copolymer has a Mw/Mn of less than about 2.5.

15. The block copolymer of claim 1, wherein said A block comprises in the range of from about 5 to about 90 weight percent of said block copolymer.

16. The block copolymer of claim 1, wherein said A block comprises in the range of from about 10 to about 60 weight percent of said block copolymer.

17. The block copolymer of claim 1, wherein said block copolymer has a number average molecular weight in the range of from about 750 to about 20,000,000.

18. An oil composition comprising the block copolymer of claim 1, said composition including an oil selected from this group consisting of fuel oil, heating oil, and lubricating oil.

19. A lubricating oil including a viscosity modifier, said viscosity modifier comprising a functionalized derivative of the block copolymer of claim 1.

20. A lubricating oil including a dispersant, said dispersant comprising a functionalized derivative of the block copolymer of claim 1.

21. A functionalization reaction product comprising the block copolymer of claim 1.

22. A lubricating oil including a viscosity modifier, said viscosity modifier comprising the block copolymer of claim 1.

23. A lubricating oil concentrate comprising the block copolymer of claim 1.

24. A thermoplastic elastomer comprising the block copolymer of claim 1.

25. A thermoplastic blend comprising the copolymer of claim 1.

26. A bitumen blend comprising the copolymer of claim 1.

27. A hot melt adhesive comprising the copolymer of claim 1.

28. A roof sheeting compound comprising the copolymer of claim 1.

29. The block copolymer of claim 1, wherein said block copolymer is coupled with at least another of said block copolymers.

30. The block copolymer of claim 29 wherein said coupling takes place in the presence of a coupling agent, said coupling agent being selected from the group consisting of $AlX_3$, $BX_3$, $SnX_4$, $SbX_5$, $AlR_yX_{3-y}$ where y is 0 to 1.5, R is a hydrocarbon radical, $BX_4$, $TiX_4$ and mixtures thereof, where X is selected from the group consisting of chlorine, bromine, and iodine.

31. The block copolymer of claim 29 wherein said coupling takes place in the presence of a coupling agent, said coupling agent being a free radical coupling agent selected from the group consisting of dicumyl peroxide, d-tertiarybutylperoxide, t-butylperbenzoate, 1,1-di(t-butylperoxy)-3,3,5-trimethyl cyclohexane, azo-bisisobutrolnitrile, azodicarboxylate, and mixtures thereof.

32. The block copolymer of claim 29 wherein said coupling takes place in the presence of a coupling agent, said coupling agent being selected from the group consisting of sulfur dichloride, disulfenyl halides, borane, dithioalkanes, and mixtures thereof.

33. The block copolymer of claim 29 wherein said coupling takes place in the presence of a coupling agent, said coupling agent being an alkyl phenol formaldehyde mixture catalyzed with a catalyst selected from the group consisting of $ZnCl_2$, N-bromosuccinimide and diphenylbromomethane.

34. The block copolymer of claim 29 wherein said coupling takes place in the presence of a coupling agent, said coupling agent being sulfur and a sulfur accelerator.

35. The block copolymer of claim 29 wherein said coupling takes place in a polymerization reactor.

36. The block copolymer of claim 29 wherein said coupling of said block copolymer takes place outside a polymerization reactor.

37. A block copolymer comprising an A block and a B block, said B block having 2 or more segments, wherein the A block consists of a high polymer of ethylene, said B block having at least one ethylene, α-olefin copolymer segment, where said α-olefin is other than ethylene, and a non-conjugated diene, said tip segment being at the end of said B block, said tip segment being furthest of said segments from an A B junction;

said block copolymer having a n-hexane soluble portion, not exceeding about 30 weight percent based on the total weight of the block copolymer;

wherein said block copolymer is made by a process utilizing a vanadium catalyst system, wherein said vanadium catalyst system comprises a vanadium compound premixed with an organoaluminum compound, said premixing being for a sufficient time to produce an adequate quantity of active catalyst; wherein said vanadium compound is represented by one of the general formulas:

$$VCl_x(OR)_{3-x}; \quad (1)$$

$$VCl_x(COOR)_{3-x}; \quad (2)$$

where x=0 to 3 and R=a hydrocarbon radical;

$$VCl_4;$$

$$V(AcAc)_2;$$

where AcAc=acetyl acetonate;

$$V(AcAc)_3;$$

$$VCl_x(AcAc)_{3-x}; \quad (3)$$

where x=1 or 2; and $$VCl_3.nB;$$

where n=2 to 3 and B=Lewis base capable of making hydrocarbon-soluble complexes with $VCl_3$, such as tetrahydrofuran, 2-methyl-tetrahydrofuran and dimethyl pyridine, where R represents a $C_1$ to $C_{10}$ aliphatic, acylic, or aromatic hydrocarbon radical; wherein the organoaluminum compound is represented by one of the formulas:

$AlR_3, Al(OR')R_2$ $AlR_2X \quad R_2Al—O—AlR_2$ $AlR'RX$ $Al_2R_3X_3$ $AlRX_2,$ where R and R' represent hydrocarbon radicals, said R and R' being the same or different, wherein X is a halogen selected from the group consisting of bromine, chlorine, and iodine;

wherein a non-conjugated diene is present in said B block in the range of from about 0.03 to about 2 mole percent, based on the total moles of the monomers of said A B block copolymer;

wherein said alpha-olefin in said B block is propylene;

wherein said block copolymer is present at greater than about 50 weight percent based on the total weight of polymer, as polymerized;

wherein said A B block copolymer has a Mw/Mn of less than about 2.5;

wherein said A block comprises in the range of from about 20 to about 50 weight percent of said block copolymer; and wherein said block copolymer has a molecular weight of said block copolymer is in the range of from about 750 to about 20,000,000.

38. The block copolymer of claim 37 wherein said B block contains in the range of from about 0.05 to about 1 mole percent of a non-conjugated diene based on the total moles of the monomers of the A B block copolymer.

39. A process for preparing an olefin block copolymer, comprising:

(a) forming a catalyst by premixing the reaction product of a vanadium compound represented by one of the formulas:

$$VCl_x(OR)_{3-x}; \quad (1)$$

$$VCl_x(COOR)_{3-x}; \quad (2)$$

where x=0 to 3 and R=a hydrocarbon radical;

$$VCl_4;$$

$$V(AcAc)_2;$$

where AcAc=acetyl acetonate;

$$V(AcAc)_3;$$

$$VCl_x(AcAc)_{3-x}; \quad (3)$$

where x=1 or 2; and $$VCl_3.nB;$$

where n=2 to 3 and B=Lewis base capable of making hydrocarbon-soluble complexes with $VCl_3$, such as tetrahydrofuran, 2-methyl-tetrahydrofuran and dimethyl pyridine, where R represents a $C_1$ to $C_{10}$ aliphatic, acylic, or aromatic hydrocarbon radical;

and an organoaluminum compound represented by one of the formulas:

$AlR_3Al(OR')R_2$ $AlR_2X \quad R_2Al—O—AlR_2$ $AlR'RX$ $Al_2R_3X_3$ $AlRX_2,$ where R and R' represent hydrocarbon radicals, said R and R' being the same or different, wherein X is a halogen selected from the group consisting of bromine, chlorine, and iodine;

said premixing being for a sufficient period of time to produce an adequate quantity of active catalyst;

(b) feeding the reaction product of step (a) to a reactor concurrently with a feed stream consisting of ethylene to form an A block consisting of a high polymer of ethylene; and then (c) feeding at least a second monomer stream including ethylene and an β-olefin other than ethylene, at a time of at least 0.1 seconds after step (b);

(d) feeding a monomer stream including ethylene, an α-olefin other than ethylene and a non-conjugated diene.

40. The process of claim 39, wherein said catalyst is comprised of $VCl_4$ as said vanadium compound and $Al_2R_3Cl_3$ as said organoaluminum compound, where R is an ethyl group.

41. The process of claim 39 wherein said non-conjugated diene is selected from the group consisting of vinyl norbornene, 5-methylene-2-norbornene, 5-ethylidene-2-norbornene, dicyclopentadiene, and tetrahydroindene.

* * * * *